US010127742B2

(12) United States Patent
Seibert

(10) Patent No.: US 10,127,742 B2
(45) Date of Patent: Nov. 13, 2018

(54) PORTABLE DEVICE AND METHOD FOR QUERYING A VEHICLE NETWORK

(71) Applicant: SEIBERT WILLIAMS GLASS, LLC, Batavia, OH (US)

(72) Inventor: Joseph J. Seibert, Cincinnati, OH (US)

(73) Assignee: SEIBERT WILLIAMS GLASS, LLC, Batavia, OH (US)

( * ) Notice: Subject to any disclaimer, the term of this patent is extended or adjusted under 35 U.S.C. 154(b) by 0 days.

(21) Appl. No.: 15/404,496

(22) Filed: Jan. 12, 2017

(65) Prior Publication Data
US 2017/0140583 A1 May 18, 2017

Related U.S. Application Data

(63) Continuation of application No. PCT/US2016/032393, filed on May 13, 2016, which is a continuation-in-part of application No. 14/886,863, filed on Oct. 16, 2015, now Pat. No. 9,417,078, application No. 15/404,496, filed on Jan.
(Continued)

(51) Int. Cl.
*G07C 5/08* (2006.01)
*H04L 29/08* (2006.01)
*G06N 5/04* (2006.01)
*G07C 5/02* (2006.01)

(52) U.S. Cl.
CPC ............ *G07C 5/0816* (2013.01); *G06N 5/04* (2013.01); *G07C 5/08* (2013.01); *G07C 5/0858* (2013.01); *H04L 67/12* (2013.01); *G07C 5/02* (2013.01); *G07C 2205/02* (2013.01)

(58) Field of Classification Search
None
See application file for complete search history.

(56) References Cited

U.S. PATENT DOCUMENTS 3,836,955 A 9/1974 Cracraft et al.
5,260,684 A 11/1993 Metzmaker
(Continued)

OTHER PUBLICATIONS

International Search Report and Written Opinion (ISRWO), dated Nov. 30, 2012, for related International Application Serial No. PCT/US2012/026671, filed Feb. 25, 2012 (13 pages).
(Continued)

*Primary Examiner* — Nicholas K Wiltey
(74) *Attorney, Agent, or Firm* — Daniel F. Nesbitt; Hasse & Nesbitt, LLC

(57) ABSTRACT

A portable controller device having an OBD-II port interface and a microcontroller that interacts with a vehicle network through the interface, including programming for querying successively the vehicle network for one or more parameter, and for retrieving values for the parameter returned from the network. The retrieving values for the parameter returned from the network is compared with an inferring response or parameter value, such as an absence of a response to query of the monitoring parameter, that if satisfied can infer that the journey status of the vehicle has changed from 'underway' to 'ended', and identifies the monitoring parameter as a candidate parameter. The journey status can be confirm as 'ended' when successive querying of the candidate parameter returns the same an absence of a response.

20 Claims, 8 Drawing Sheets

Related U.S. Application Data 12, 2017, which is a continuation of application No. 15/286,841, filed on Oct. 6, 2016, which is a continuation of application No. 14/990,957, filed on Jan. 8, 2016, now abandoned, which is a continuation of application No. 14/001,258, filed on Nov. 4, 2013, now abandoned.

(60) Provisional application No. 62/169,960, filed on Jun. 2, 2015, provisional application No. 62/162,359, filed on May 15, 2015.

(56) References Cited

U.S. PATENT DOCUMENTS

| | | | |
|---|---|---|---|
| 5,581,234 | A | 12/1996 | Emery et al. |
| 5,793,291 | A | 8/1998 | Thornton |
| 5,794,064 | A | 8/1998 | Beckert et al. |
| 5,901,978 | A | 5/1999 | Breed et al. |
| 5,927,512 | A | 7/1999 | Beffa |
| 5,949,340 | A | 9/1999 | Rossi |
| 5,966,070 | A | 10/1999 | Thornton |
| 6,002,325 | A | 12/1999 | Conaway |
| 6,009,363 | A | 12/1999 | Beckert et al. |
| 6,028,509 | A | 2/2000 | Rice |
| 6,104,293 | A | 8/2000 | Rossi |
| 6,357,091 | B1 | 3/2002 | Devereaux |
| 6,489,889 | B1 | 12/2002 | Smith |
| 6,498,562 | B2 | 12/2002 | Yano |
| 6,529,723 | B1 | 3/2003 | Bentley |
| 6,535,137 | B1 | 3/2003 | Ryan |
| 6,662,413 | B2 | 12/2003 | Glover |
| 6,714,132 | B2 | 3/2004 | Edwards et al. |
| 6,812,844 | B1 | 11/2004 | Burgess |
| 6,832,141 | B2 | 12/2004 | Skeen et al. |
| 6,922,147 | B1 | 7/2005 | Viksnins et al. |
| 6,922,154 | B2 | 7/2005 | Kraljic et al. |
| 6,922,622 | B2 | 7/2005 | Dulin et al. |
| 6,924,742 | B2 | 8/2005 | Mesina |
| 6,930,614 | B2 | 8/2005 | Rackham et al. |
| 6,998,988 | B1 | 2/2006 | Kalce |
| 7,012,533 | B2 | 3/2006 | Younse |
| 7,089,099 | B2 | 8/2006 | Shostak et al. |
| 7,170,401 | B1 | 1/2007 | Cole |
| 7,218,218 | B1 | 5/2007 | Rogers |
| 7,250,869 | B2 | 7/2007 | Davis |
| 7,256,700 | B1 | 8/2007 | Ruocco et al. |
| 7,319,382 | B1 | 1/2008 | Vu |
| 7,321,306 | B2 | 1/2008 | Lee et al. |
| 7,378,974 | B1 | 5/2008 | Bassett et al. |
| 7,378,979 | B2 | 5/2008 | Rams, Jr. |
| 7,397,416 | B2 | 7/2008 | Orr et al. |
| 7,463,161 | B2 | 12/2008 | Griffin et al. |
| 7,466,217 | B1 | 12/2008 | Johnson et al. |
| 7,489,247 | B2 | 2/2009 | Lee et al. |
| 7,555,370 | B2 | 6/2009 | Breed et al. |
| 7,663,493 | B2 | 2/2010 | Monzo et al. |
| 7,714,737 | B1 | 5/2010 | Morningstar |
| 7,733,228 | B2 | 6/2010 | Lee et al. |
| 7,786,852 | B2 | 8/2010 | Kautz |
| 8,154,395 | B2 | 4/2012 | Taylor |
| 8,432,271 | B2 | 4/2013 | Qian et al. |
| 9,417,078 | B1 * | 8/2016 | Seibert ............... G07C 5/0858 |
| 2003/0122662 | A1 | 7/2003 | Quinonez |
| 2003/0160689 | A1 | 8/2003 | Yazdgerdi |
| 2004/0239183 | A1 | 12/2004 | Delgado et al. |
| 2005/0231342 | A1 | 10/2005 | Kim |
| 2006/0017552 | A1 | 1/2006 | Andreasen et al. |
| 2008/0015748 | A1 | 1/2008 | Nagy |
| 2008/0290990 | A1 | 11/2008 | Schaffzin et al. |
| 2009/0079557 | A1 | 3/2009 | Miner |
| 2009/0112394 | A1 | 4/2009 | Lepejian et al. |
| 2009/0115594 | A1 * | 5/2009 | Han .................. B60Q 1/52 340/471 |
| 2009/0265057 | A1 | 10/2009 | Chinnadurai et al. |
| 2010/0022198 | A1 | 1/2010 | Hamilton |
| 2010/0087984 | A1 | 4/2010 | Joseph |
| 2010/0130160 | A1 | 5/2010 | Fayyad |
| 2010/0268423 | A1 | 10/2010 | Breed |
| 2011/0009107 | A1 | 1/2011 | Guba et al. |
| 2011/0012720 | A1 | 1/2011 | Hirschfeld |
| 2011/0015998 | A1 | 1/2011 | Hirschfeld |
| 2011/0025486 | A1 | 2/2011 | Qian et al. |
| 2011/0109450 | A1 | 5/2011 | Hirschfeld et al. |
| 2011/0109468 | A1 | 5/2011 | Hirschfeld et al. |
| 2011/0123039 | A1 | 5/2011 | Hirschfeld et al. |
| 2011/0285524 | A1 | 11/2011 | Qian et al. |
| 2013/0073450 | A1 | 3/2013 | Swan |
| 2014/0074353 | A1 | 3/2014 | Lee et al. |
| 2014/0229075 | A1 | 8/2014 | Lopez |

OTHER PUBLICATIONS

International Preliminary Report of Patentability (IPRP), dated Sep. 6, 2013, for related International Application Serial No. PCT/US2012/026671, filed Feb. 25, 2012 (9 pages).

International Search Report and Written Opinion (ISRWO), dated Aug. 10, 2016, for related International Application Serial No. PCT/US2016/032393, filed May 13, 2016 (14 pages).

Barth, Liza, "Warning Systems to Detect Children Left in Hot Cars Found Unreliable, Study Finds", Consumer Reports News, at www.consumerreports.org/cro/news, on Aug. 1, 2012 (1 page).

Braukus, Michael, et al., "NASA Develops Child Car-Seat Safety Device", Waybackmachine, at www.4kidssake.org/NASAdevice, on Feb. 5, 2002 (2 pages).

Webpage, "Baby Alert International—For Baby Safety and Child Safety",Waybackmachine, at https://web.archive.org/web/20110225013417/http://www.babyalert.info, on Feb. 24, 2011 (1 page).

Supplemental Examination Certificate, Control No. 96/000,239, dated Dec. 29, 2017 (2 pages).

Reasons for Substantial New Question of Patentability Determination, Control No. 96/000,239, dated Dec. 29, 2017 (14 pages).

* cited by examiner

TABLE B

| Time (msec) | OBD Device | OBD-Network response |
|---|---|---|
| 0 | Q-RUNTIME | Dynamic value runtime a |
| 100 | Q-VEH. SPEED | Dynamic value velocity a |
| 200 | Q-RPM | Dynamic value rpm a |
| 300 | Q-RUNTIME | Dynamic value runtime b |
| 400 | Q-VEH. SPEED | Dynamic value velocity b |
| 500 | Q-RPM | 0 |
| 600 | Q-RPM | 0 (n=1) |
| 700 | Q-RPM | 0 (n=2) |
| 800 | Q-RPM | 0 (n=3) |
| 900 | Q-RPM | 0 (n=4) |
| 1000 | Q-RPM | 0 (n=5) |
| 1100 | No query | |
| 1200 | No query | |

Journey Underway → Monitoring mode (Cycle a, Cycle b) → Confirming mode (Predetermined Term of 'n' queries) → Journey Ended

FIG. 1

TABLE C

| Time (msec) | OBD Device | OBD-Network response |
|---|---|---|
| 0 | Q-RUNTIME | Dynamic value runtime a |
| 100 | Q-VEH. SPEED | Dynamic value velocity a |
| 200 | Q-RPM | Dynamic value rpm a |
| 300 | Q-RUNTIME | Dynamic value runtime b |
| 400 | Q-VEH. SPEED | Dynamic value velocity b |
| 500 | Q-RPM | Identical value rpm a (n=1) |
| 600 | Q-RPM | Identical value rpm a (n=2) |
| 700 | Q-RPM | Identical value rpm a (n=3) |
| 800 | Q-RPM | Identical value rpm a (n=4) |
| 900 | Q-RPM | Identical value rpm a (n=5) |
| 1000 | Q-RPM | Identical value rpm a |
| 1100 | No query | |
| | No query | |

Journey Underway → Monitoring mode (Cycle a, Cycle b) → Confirming mode (Predetermined Term of 'n' queries) → Journey Ended

FIG. 2

TABLE D

| Time (msec) | OBD Device | OBD-Network response |
|---|---|---|
| 0 | Q-RUNTIME | Dynamic value runtime a |
| 100 | Q-VEH. SPEED | Dynamic value velocity a |
| 200 | Q-RPM | Dynamic value rpm a |
| 300 | Q-RUNTIME | Dynamic value runtime b |
| 400 | Q-VEH. SPEED | No response |
| 500 | Q-VEH. SPEED | No response (n=1) |
| 600 | Q-VEH. SPEED | No response (n=2) |
| 700 | Q-VEH. SPEED | No response (n=3) |
| 800 | Q-VEH. SPEED | No response (n=4) |
| 900 | Q-VEH. SPEED | No response (n=5) |
| 1000 | No query | |
| 1100 | No query | |

Journey Underway → Monitoring mode (Cycle a, Cycle b) → Confirming mode (Predetermined Term of 'n' queries) → Journey Ended

FIG. 3

TABLE E

Journey Underway → Monitoring mode → Confirming mode → Journey Ended

Cycle a | Cycle b | Cycle c | Predetermined Term of 'n' queries

| Time (msec) | OBD Device | OBD-Network response |
|---|---|---|
| 0 | Q-RUNTIME | Dynamic value runtime "x" |
| 100 | Q-VEH. SPEED | Dynamic value velocity a |
| 200 | Q-RPM | Dynamic value rpm a |
| 300 | Q-RUNTIME | Dynamic value runtime "x" |
| 400 | Q-VEH. SPEED | Dynamic value velocity b |
| 500 | Q-RPM | Dynamic value rpm b |
| 600 | Q-RUNTIME | 0 |
| 700 | Q-RUNTIME | 0 (n=1) |
| 800 | Q-RUNTIME | 0 (n=2) |
| 900 | Q-RUNTIME | 0 (n=3) |
| 1000 | Q-RUNTIME | 0 (n=4) |
| 1100 | No query | |

FIG. 4

TABLE F

Monitoring mode → Monitoring mode
Confirming mode

ECU Reset

Pre-determined term of 'Δt=1200 msec'

Cycle a | Cycle b | Cycle c | Cycle d

| Time (msec) | OBD Device | OBD-Network response |
|---|---|---|
| 0 | Q-RPM | Dynamic value rpm a |
| 250 | Q-RUNTIME | Dynamic value runtime a |
| 500 | Q-VEH. SPEED | Dynamic value velocity a |
| 750 | Q-RPM | No response |
| 1000 | Q-RPM | No response |
| 1250 | Q-RPM | No response |
| 1500 | Q-RPM | No response |
| 1750 | Q-RPM | Dynamic value rpm c |
| 2000 | Q-RUNTIME | Dynamic value runtime c |
| 2250 | Q-VEH. SPEED | Dynamic value velocity c |
| 2500 | Q-RPM | Dynamic value rpm d |
| 2750 | ... | ... |

FIG. 5

PORTABLE DEVICE AND METHOD FOR QUERYING A VEHICLE NETWORK

CROSS-REFERENCE TO RELATED APPLICATIONS

This is a continuation of International Application PCT/US2016/032393, filed May 13, 2016, which is a continuation-in-part of U.S. patent application Ser. No. 14/886,863, filed Oct. 19, 2015, and of U.S. Provisional Patent Applications Nos. 62/169,960, filed Jun. 2, 2015, and 62/162,359, filed May 15, 2015, and is a continuation of U.S. patent application Ser. No. 15/286,841, filed Oct. 6, 2016, which is a continuation of U.S. patent application Ser. No. 14/990,957, filed Jan. 8, 2016, which was a continuation of U.S. patent application Ser. No. 14/001,258, filed Aug. 23, 2013, the disclosures of which are incorporated herein by reference.

FIELD OF THE INVENTION

This invention relates to devices for querying vehicle networks.

BACKGROUND OF THE INVENTION

There have been a number of efforts addressing the tragic deaths of children who have been mistakenly left in automobiles or vehicles after the driver had reached his/her desired destination and left the vehicle. The deaths have usually been caused by a buildup of excessive heat or excessive cold within the vehicle during the absence of the driver. Conventional infant car seats and toddler booster seats are intended to restrain the infant or toddler during transportation within the vehicle, and are typically designed so that the infant or toddler cannot by oneself release the seat belt or restraint. Infants and small children are rapidly susceptible to hyperthermia when subjected to the elevated temperatures within an enclosed vehicle, with sometimes fatal consequences.

Review of child accidental deaths cases due to hyperthermia in vehicles demonstrates that this usually occurs when the parent or caretaker has deviated from a usual routine with the child. For example, a different vehicle is used, or a different parent takes the child to a destination that day due to the exigencies of family and work life.

The prior art includes numerous references that suggest detecting the status of a vehicle's ignition and determining the presence of a child in the child safety seat, to alert the driver that the child is still in the child safety seat when the drive is ended, including U.S. Pat. Publication Nos. 2009/0079557 and 2011/0109450, and U.S. Pat. Nos. 6,104,293, 5,949,340, and 6,489,889, the disclosures of which are incorporated by reference. However, none of these references describe in specific detail how a device or a method using the device detects or determines the vehicle ignition status or state, using information collected from a network on the vehicle. There is, for example, no known mandated network message that identifies the position of the vehicle key in the ignition as in either the 'on' or 'off' position.

Modern vehicles use onboard data networks to communicate useful information between microcontrollers found both within the vehicle and within devices attached to the OBD-II port. Microcontrollers communicating on the vehicle network "query" (request information from) other microcontrollers on the network by transmitting a request message containing a predefined Parameter Identifier (PID). One or more microcontrollers on the network respond to such a query by transmitting a response message containing the value of the requested vehicle operating parameter (for example, engine revolutions per minute (RPM) or vehicle speed).

U.S. law, and by law in other countries, mandates the reporting of standard parameters by the vehicle network when queried via a device connected to standard sockets (Pins 6 and 14, in the case of the CAN protocol) on the OBD-II port. ISO 15765 defines the Controller Area Network (CAN) protocol that is mandated for use in North American passenger and light truck vehicles since 2008. Reference is made to http://en.wikipedia.org/wiki/OBD-II_PIDs. The OBD-II port has been a required feature on all passenger vehicles and light trucks sold in the US since Jan. 1, 1996. These networks use CAN and other communication protocols.

US Patent Publ. No. 2014/0052342 (Seibert), the disclosure of which is incorporated by reference, discloses a portable device that plugs directly into the OBD-II port of a vehicle that queries a vehicle network through the OBD-II port for the value of a parameter(s), and generating an alarm in response to a predetermined condition of the parameter(s), and a buckle status signal from a child restraint device of a safety seat.

In view of the above, there remains a need to provide a convenient, more portable, effective system for use by drivers of vehicles for determining, or inferring with high predictability, the status of a driver's journey, indicating when the driver has ended the journey and has arrived at his/her desired destination, has turned off the operating systems of the vehicle, and will leave the vehicle. Such a convenient, portable and effective device or system could then be used in combination with a device that detects the presence of a child in a child safety seat or that detects the restraint status of the child in the child safety seat, so that an alarm can be generated that warns the driver when a child has been left secured into the child safety seat after the journey has ended.

SUMMARY OF THE INVENTION

The invention relates to a controller device useful for inferring and/or determining the journey status of a vehicle and of its driver, and for inferring and/or determining when a vehicle's journey status changes from "underway" to "ended", or from "ended" to "underway", or both. The controller device can include a portable controller device which is configured to plug into the OBD-II port of a vehicle, or a native or on-board controller device that interacts with the vehicle network. The portable controller device is configured to plug into the On-Board Diagnostic II (OBD-II) port of a passenger vehicle, light truck, or commercial vehicle or truck, (collectively referred to as a vehicle or passenger vehicle unless the context states or suggests otherwise) and is placed into electronic communication with the vehicle network via one or more pins of the OBD-II port.

The invention provide a reliable device and method for accurately inferring and determining the journey status of a passenger vehicle, for substantially all makes and models of automobiles and trucks in the world, and that comply with OBD-II standards.

A portable controller device of the invention can include a microcontroller that is configured, for example with programming, for querying the vehicle's network for parameters, by the use of one or more PIDs; for querying and retrieving, and optionally storing, a response of a value of the parameter or parameters returned by the vehicle's network, or the lack of a response, to the network queries employing the associated PIDs; and for inferring the vehicle's journey status based upon the response of the network of the value of the parameter, or absence of a response, and to determine if the vehicle's journey status is 'underway' or is 'ended', or to determine if the vehicle's journey status has changed from 'underway' to 'ended', or has changed from 'ended' to 'underway', or both.

In an aspect of the invention, the microcontroller is configured, for example with programming, for querying and retrieving, and optionally storing, a response of the network of a value of a parameter, or a plurality of parameters returned by the vehicle's network in response to queries containing a Parameter Identifier (PID) associated with each parameter.

In another aspect, the value of the parameter(s) can be used to infer, and more particularly, to confirm or to determine, that the vehicle and the driver have arrived at a destination, and that the journey has 'ended', or are 'underway' on the journey. From the inferred or determined journey status as 'ended' or 'underway', the controller device can be configured to broadcast the inferred or determined status of the journey, as "underway' or 'ended', and both, to the driver, to another device, or to a communication system, or to emit an alarm or warning signal in at least partial response to the inferred or determined status of the driver or the journey, as "underway' or 'ended', and both; for example when a journey is inferred or determined to have 'ended', and the controller device, or another device in broadcast communication with the controller device, indicates the actual or implied presence of a child in the vehicle, including in a child safety seat within the vehicle.

In an aspect of the invention, the vehicle network includes the CAN network, or any standardized communication protocol.

In an aspect of the invention, the one or more parameters to be queried use a plurality of predefined and distinct PIDs. This can include querying parameters associated with two to ten distinct PIDs, which can include two to five PIDs, and including three to five PIDs.

In an aspect of the invention, a predetermined inferring response or parameter value that may be returned by a vehicle's network in response to a query of a parameter, is at least one of an absence of a response to the querying, or two, three, or more consecutive identical, non-zero values in response to successive querying of a parameter. Optionally, a predetermined inferring response or parameter value can be a zero value.

A portable controller device of the invention can also include an interface that plugs into an On-Board Diagnostic II (OBD-II) port of a vehicle, and a microcontroller that interacts with a network of the vehicle through the interface, including programming to configure the controller for a monitoring mode, while a vehicle journey status is 'underway', where the controller queries, or is configured to query, a predetermined monitoring parameter on the network, including one or more predetermined monitoring parameter.

In an embodiment of the invention, the microcontroller is configured to compare the response or parameter value returned by the network to the query of the predetermined monitoring parameter, against a predetermined inferring response or parameter value that includes an absence of a response to the query of the predetermined monitoring parameter. When the returned response or parameter value of the network is the absence of a response by the network to the query of the predetermined monitoring parameter, the vehicle journey that was 'underway' is inferred to have changed to 'ended', and the predetermined monitoring parameter is defined as a candidate parameter.

In another embodiment of the invention, the microcontroller is configured to monitor for a response from the network to the query of the predetermined monitoring parameter, and to infer that the vehicle journey that was 'underway' has changed to 'ended' if there is an absence of a response from the network to the query of the predetermined monitoring parameter.

In yet another embodiment of the invention, the microcontroller is configured to monitor for a response from the network to the query of the predetermined monitoring parameter, and to infer that the vehicle journey that was 'underway' has changed to 'ended' if the value of the response from the network to the querying of the predetermined monitoring parameter is two, three or more, successive, identical non-zero values.

In another aspect of the invention, the microcontroller is configured, for example with programming, for querying during a mode of using the microcontroller for a parameter or plurality of parameters using a PID, including one or a plurality of PIDs, one or more times for any one or more of the PIDs, within a brief temporal period. This can include querying during a mode using the PID, or each of the plurality of PIDs, from two to ten times, including two to five times, and including three to five times, within a temporal period of about 10 seconds or less, more typically of 1 second or less, including about 0.5 seconds or less. In a further aspect of the invention, the querying of a parameter using a PID, including a plurality of PIDs, from one or more times within a brief temporal period, can include querying for successive temporal periods of time. The plurality, or more than one, predetermined monitoring parameter can include the first predetermined monitoring parameter, and a second additional one or more predetermined monitoring parameter.

In a further aspect, the microcontroller is configured, in a method, to include a monitoring mode that queries one or more, including a plurality of, predetermined and distinct parameters ("monitoring parameters") on the network, and screens or tests each response or parameter value returned by the network to the query of the monitoring parameters, against a predetermined response or parameter value ("an inferring response or value"). If the returned response or parameter value is or satisfies the inferring response or value, then the controller and programming has established an inference that a vehicle journey that is presently or was 'underway', has changed to 'ended'. If the response or parameter value returned against a monitoring parameter is the inferring response or value, such monitoring parameter is identified as a candidate parameter for further evaluation to confirm the inference that the journey status has changed to 'ended'.

The invention can include a method for inferring that a vehicle having a vehicle journey status of 'underway' has 'ended', comprising in a monitoring mode the steps of: a) querying continuously (or successively) a predetermined monitoring parameter on the network; and b) comparing a response to the query of the predetermined monitoring parameter, returned by the network, against a predetermined inferring response or parameter value that infers that the vehicle journey has changed to 'ended'. In one embodiment of the invention, the predetermined inferring response or parameter value comprises the absence of a response to query of the monitoring parameter. In another embodiment of the invention, the predetermined inferring response or parameter value is the absence of a response to query of the monitoring parameter. In a further embodiment of the invention, the predetermined inferring response or parameter value can be the absence of a response to query of the monitoring parameter, or can be two, three or more successive, identical non-zero values in response to query of the monitoring parameter.

The method of the invention can further includes c) identifying the monitoring parameter as a candidate parameter if the response to the query of the monitoring parameter is the predetermined inferring response or parameter value.

In another embodiment of the invention, the method of the invention alternatively includes c) inferring that a vehicle having a vehicle journey status of 'underway', or that was 'underway', has 'ended' when the response to the query of the predetermined monitoring parameter is the predetermined inferring response or parameter value; and d) identifying the predetermined monitoring parameter as a candidate parameter.

In a further embodiment of the invention, the method of the invention alternatively includes c) inferring that the vehicle journey that had a status of 'underway', or was 'underway', has changed to 'ended', when the returned response or parameter value by the network is the absence of a response by the network to the query of the predetermined monitoring parameter; and optionally d) defining the predetermined monitoring parameter as a candidate parameter.

The invention can further include a method for inferring that a vehicle having a vehicle journey status of 'underway' has 'ended', comprising in a monitoring mode the steps of: a) querying, preferably continuously or successively, a predetermined monitoring parameter on the network, and b) monitoring for a response from the network to the query of the predetermined monitoring parameter. The method can further include c) inferring that the vehicle journey that was 'underway' has changed to 'ended' when there is an absence of a response from the network, or there are two, three, or more successive identical, non-zero values, returned from the network to the querying of the predetermined monitoring parameter.

The first predetermined monitoring parameter can be monitored by testing (for example, by comparing) the response returned by the network against a first predetermined inferring response or value. In another embodiment, the first predetermined monitoring parameter can be monitored or by testing independently and individually the response returned by the network against the first predetermined inferring response or value, and a second one or more predetermined inferring response or value. If at least one of the first predetermined inferring response or value, and the second additional one or more predetermined inferring response or value, is satisfied by the response returned by the network for the first predetermined monitoring parameter, then the vehicle journey that was 'underway' is inferred to have changed to 'ended'. Likewise, a second additional predetermined monitoring parameter can be monitored by testing the response returned by the network against a first predetermined inferring response or value for said second additional predetermined monitoring parameter, which can be the same or different from the first predetermined inferring response or value tested against the first predetermined monitoring parameter, or by testing independently and individually the response returned by the network against said first predetermined inferring response or value, and a second additional one or more predetermined inferring response or value. If at least one of said first predetermined inferring response or value, and said second one or more predetermined inferring response or value for said second additional predetermined monitoring parameter, is satisfied by the response returned by the network for the second additional monitoring parameter, then the vehicle journey that was 'underway' is inferred to have changed to 'ended'. The first predetermined monitoring parameter or the second additional one or more predetermined monitoring parameter that has been satisfied by the response returned by the network, is defined as a candidate parameter.

The microcontroller and method also includes a confirming mode or step that further queries the candidate parameter one or more times, including a plurality of times in succession, within a predefined term, and tests each response or parameter value returned by the network for the query of the candidate parameter against an inferring response or value. If each response or parameter value returned during the predefined term for such candidate parameter is also an inferring response or value, then the journey status is deemed to have changed to 'ended'. In an aspect of the invention, the inferring response or value of the confirming mode or step is the same predetermined inferring response or value of the monitoring mode or step that, when satisfied, defined the candidate parameter.

In a further aspect of the invention, the storing of a value of a parameter, including a plurality of parameters independently, for one or more times within a brief temporal period, can including storing a plurality of the most recently collected values of a parameter or parameters.

In another aspect of the invention, the microcontroller can be configured, for example with programming, for analyzing or performing an algorithm against the retrieved (and optionally stored) value of a parameter or parameters, queried by using one or more predefined PIDs, and of the plurality of parameters, that are returned by the vehicle's network, and inferring the vehicle's journey status from the collected (and stored) parameter values, to determine if the vehicle's journey status is 'underway', or is 'ended', or to determine if the vehicle's journey status has changed from 'underway' to 'ended', or has changed from 'ended' to 'underway', or both.

In a further aspect of the invention, an inference can be made, from a plurality of successive parameter responses or values returned by querying the network using one or more associated PIDs, termed an inferring response or value, that a vehicle journey that had been 'underway' has changed to 'ended', when (1) two or more successive returned parameter values of a queried PID is zero, or (2) two or more successive returned parameter values of a queried PID have identical non-zero values; or (3) the vehicle network fails to reply to the two or more successive queries for a parameter; or a combination thereof.

The invention also relates to a child safety seat system that includes a portable controller device described herein for inferring or determining the journey status of a vehicle and of its driver, and a child safety seat device in communication with the portable controller device, for detecting when a child has been left present or restrained in a child safety seat. The child safety device can be a restraint device with a buckling detector, or a detector for the child's weight, body temperature, movement, or image with the child secured into the child safety seat.

The invention also relates to a method for inferring that a vehicle having a vehicle journey status of 'underway' has arrived at a destination, indicating that the vehicle journey status is 'ended', comprising the steps of: a) querying successively and plurally a vehicle network for one or more parameters using associated PIDs; b) retrieving a plurality of parameter values returned by the network for the one or more queried PIDs; c) inferring that the vehicle has arrived at the destination, and that the vehicle journey status is 'ended', by determining from the plurality of retrieved parameter values of the one or more queried PIDs when at least one of the following occurs: (i) a predetermined number of successive zero retrieved parameter values for the one or more queried PIDs; or (ii) a predetermined number of successive identical non-zero retrieved parameter values for one or more PIDs; or (iii) no response (absence of a response) after querying using the one or more PIDs; or a combination thereof.

The one or more PIDs can comprise or consist of a plurality of the PIDs, including two to five PIDs, and the plurality of successive retrieved parameter values includes two to ten successive retrieved values, within a temporal period of about 10 seconds or less, including 1 second or less.

Another aspect of the invention is to postpone or "withhold" a status of a journey as "underway", and the monitoring of parameters in the monitoring mode, until the vehicle has been driven for a minimum distance (for example, at least 0.01 mile) or for a minimum vehicle speed (to at least 5 miles per hour (mph)). The postponing or withholding of a journey as underway can distinguish a short term driving of the vehicle, for example, to back the vehicle out of the garage into the driveway, or when a parent needs to turn off the vehicle temporarily to lock a door in the residence with a key on the same key rings as the vehicle.

The invention also relates to a method of warning a vehicle operator at an end of a vehicle's journey that a child has been left present or restrained in a child safety seat, the method including the steps of: providing a child safety seat including a sensor for the child, or a restraint device including a buckling detector; generating and transmitting a child presence or restraint status signal while a child is present in, or remains buckled or restrained within, the child safety seat; querying a vehicle network for one or more parameters using a portable controller device plugged into an OBD-II port of the vehicle; receiving the child presence or restraint status signal; retrieving one or more parameter values from the network in response to the one or more queried PIDs; inferring from the retrieved parameter values the status of the vehicle's journey as either 'underway' or 'ended'; and generating an alarm signal to warn the vehicle operator when the child presence or restraint status signal indicates the child is present in, or remains buckled or restrained within, the child safety seat, and when the status of the vehicle's journey has changed from 'underway' to 'ended'. The method can further include generating an alarm responsive to the alarm signal.

A further aspect of the present invention is a portable controller device that attaches to the On-Board Diagnostic II (OBD-II) port of a passenger vehicle, light truck, or commercial vehicle or truck that is configured to query the network for one or more parameters using PIDs. The portable controller device includes a means for minimizing and preventing drainage of the electrical capacity of the vehicle battery resulting from querying excessively or unnecessarily the vehicle network.

The portable controller device includes a microcontroller that interacts with the network of the vehicle through the interface. Another component that can be used for interfacing the controller with the network can be a network interface chip or a transceiver. The microcontroller can be configured for controlling a network interface chip for querying, using PIDs, the vehicle's network for one or more predefined parameters, and retrieving the value of the one or more parameters, in order to infer whether and when the vehicle's journey status is 'underway', or is 'ended'. The portable controller device includes a microcontroller and a network interface chip specific to the vehicle network protocol used (for example, CAN protocol). The microcontroller monitors the vehicle battery voltage through the vehicle battery power and ground pins of the OBD-II port, and controls the network interface chip that queries the vehicle network. The network interface chip communicates with the vehicle network through the protocol specific pins of the OBD-II port (for example, pins 6 and 14 for the CAN protocol) under the control of the microcontroller. The network interface chip may be commanded by the microcontroller at times to stop querying of the vehicle network in order to conserve vehicle battery power.

Excessive querying of the vehicle network is to be avoided because vehicle battery power losses caused by such querying of the vehicle networks can far exceed the minimal power consumption of the vehicle battery power by the portable, OBD-II-connected controller device alone. More importantly, "awakening" of vehicle ECUs when being queried causes vehicle battery power drain independent of and usually far more rapidly than any vehicle battery power drain consumed by the portable OBD controller device.

Another aspect of the invention is a method for minimizing or preventing the drainage of the electrical capacity of a vehicle battery resulting from use of a portable controller device that plugs into the On-Board Diagnostic II (OBD-II) port of a vehicle, and queries successively and continuously a network of the vehicle for a real-time response value for one or more parameters, in order to infer a vehicle journey status as either 'underway' or 'ended', comprising the steps of: a) monitoring a value of the voltage potential of a battery of the vehicle; b) stopping querying of the vehicle when a vehicle journey status is inferred to be 'ended', and the monitored vehicle battery voltage potential is at or below a first predefined voltage level that implies an inactive battery charging state; and c) thereafter restarting querying successively and continuously the network only after the monitored vehicle battery voltage potential rises above a second predefined charging level that implies an active battery charging state. The implied active battery charging state also implies or suggests the vehicle journey status is 'underway'. An active battery charging state is where the vehicle battery is being charged with an alternator driven by the engine or vehicle, and an inactive battery charging state is where the vehicle battery is not being charged.

The first predefined charging level that implies an inactive battery charging state can be 12.6 volts or less, or other voltage level at which an inactive battery charging state can be inferred. The second predefined charging level that implies an active battery charging state can be 12.9 volts or more, or other voltage level at which an active battery charging state can be inferred.

In a further aspect of the invention, querying of the network is started and stopped by means of the microcontroller controlling the network interface chip, commanding it to stop or start network querying as such internal algorithm or programming dictates.

The present invention also provides a restraint device, and a method for its use in a child safety seat or other article, that includes a battery, a microprocessor, a buckling detector, a transmitter and circuitry, and programming of the microprocessor(s) suitable for the indicated function and operations described herein. The restraint device transmits buckling and unbuckling events detected by the buckling detector, and manages its consumption of power, typically delivered by a small battery, to minimize the time, duration and frequency of the buckling status transmissions, and to consume the minimal of power during the remaining time through the use of a very low power-consuming timed sleep state and an ultra low power-consuming dormant state that is interrupted by a buckling event (into either a buckling or unbuckling state of the restraint device).

Starting from the dormant state, a buckling event awakens the microprocessor, transmits the buckle state as an RF signal. If the buckle state is 'unbuckled', the device returns to the dormant state. If the buckle state is 'buckled', the device enters a series of cycles consisting of a sleep period, an awakening, and a transmission of the 'buckled' state. The series of sleep-awake-transmission cycles is interrupted either by an 'unbuckling' event, or by a timing out or predetermined cycle cut-off in the 'buckled' state, which places the device into a dormant state.

BRIEF DESCRIPTION OF THE DRAWINGS

FIG. 1 shows a table (Table B) illustrating vehicle network traffic between a portable controller device plugged into the OBD-II port and the vehicle's ECUs, including monitoring and confirming the parameter 'RPM' for an inferring parameter value of zero that determines the vehicle journey has changed from 'underway' to 'ended'.

FIG. 2 shows a table (Table C) illustrating monitoring and confirming the parameter 'RPM' for an inferring parameter value of an identical, non-zero value that determines the vehicle journey has changed from 'underway' to 'ended'.

FIG. 3 shows a table (Table D) illustrating monitoring and confirming the parameter 'VEHICLE SPEED' for an inferring parameter value of "no response" that determines the vehicle journey has changed from 'underway' to 'ended'.

FIG. 4 shows a table (Table E) illustrating monitoring and confirming the parameter 'RUNTIME' for an inferring parameter value of zero that follows a non-zero parameter value, which determines the vehicle journey has changed from 'underway' to 'ended'.

FIG. 5 shows a table (Table F) illustrating monitoring and determining that the vehicle ECU has "reset" using an inferring parameter response of "no response" for the parameter 'RPM'.

FIG. 7A is a front perspective view, FIG. 7B is a rear view, and FIG. 7C is a partial cut-away view showing the PCB.

DETAILED DESCRIPTION OF THE INVENTION

Definitions

Figure 6:
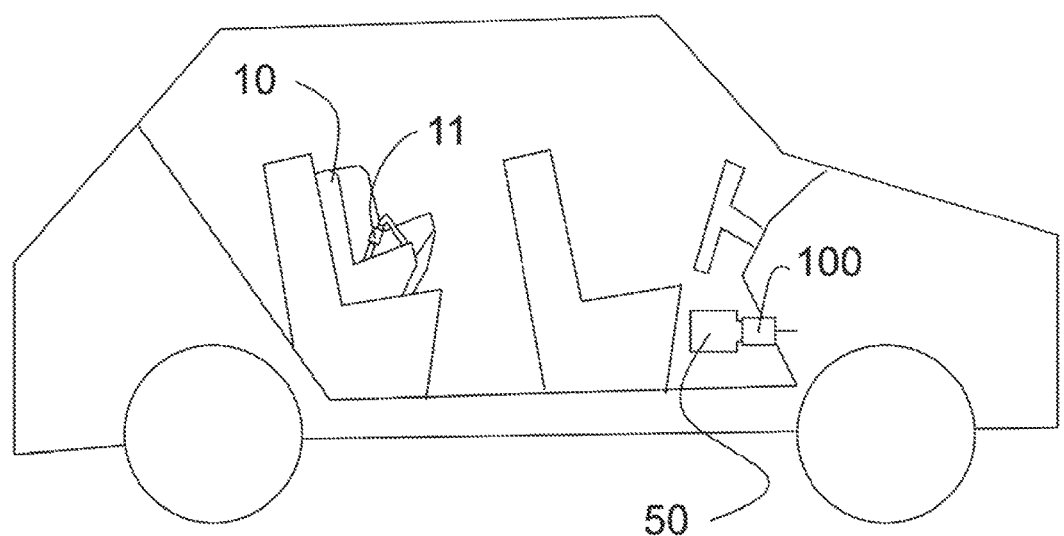
FIG. 6 illustrates child seat-vehicle safety apparatus and system of the present invention employed in a passenger vehicle, including a restraint device associated with the child safety seat, and a portable controller device that attaches to the On-Board Diagnostic II (OBD-II) port of the vehicle.

As used herein, a child safety seat is a dedicated or combination child seat, a booster seat, a convertible car seat or other similar seat for transporting a baby, infant, toddler or child in a vehicle.

As used herein, a buckle is the part of a restraint mechanism of the child safety seat or a chest clip, and is associated with one or more belt webbing straps. A latch is typically manually secured to the buckle by a parent or caregiver. The buckle typically can include a release button, typically though not necessarily colored red, for releasing the latch.

As used herein, the latch is a part of the restraint mechanism that slides into the buckle and mechanically engages the buckle, and is also associated with one or more belt webbing straps or retaining elements.

As used herein, "memory", unless otherwise specified, can include one or more processor-readable and accessible memory elements and/or components that can be internal to a processor or controlled device, or external to the processor or controlled device, can be accessed via a wired or wireless network, and can be non-volatile or volatile.

As used herein, "programming" stored upon and read by a computer, microprocessor or controller includes only non-transitory computer-readable media, comprises all computer-readable media, with the sole exception being a transitory, propagating signal.

As used herein, a journey of a vehicle that is "underway" is characterized by the driver embarking on the journey, being seated in the driver's seat of the vehicle, and having energized the engine or other movement motor, and/or preparing to operate and drive, or operating or driving, the vehicle for movement along a road or highway to a destination. As used herein, a journey of a vehicle that is "ended" is the state of the journey at any time the vehicle is not "underway", either before or after the "underway" state. The vehicle is ended when the engine has been turned to off, the ignition has been turned to off, and/or the vehicle ECUs and network have been powered down to off.

Within this description, the value of a vehicle's operating parameter (for example, engine RPM or vehicle speed), as provided by one or more microcontrollers in the vehicle network, in response to a query, will be referred to as a "value" or a "parameter value". The Parameter Identifier contained within the query message transmitted to the vehicle network when querying for a given parameter will be referred to as a "PID".

Vehicle Networks and Parameters

The details of operation of the vehicle networks can vary from manufacturer to manufacturer, and the usefulness of a parameter of vehicle operation, including engine operation, to indicate or infer that the vehicle's engine, ignition system, or ECU network has been turned off, can vary between different types, makes or models of vehicles or automobiles, including, by non-limiting example, variations between vehicles with internal combustion engines, hybrids, start/stop equipped vehicles, and all-electric cars.

The response or value of a vehicle operating parameter returned by the vehicle's network when queried using a corresponding Parameter Identifier (PID), will vary during normal vehicle operation (while the vehicle journey is 'underway'). These parameter values are determined by a sensor or detector on the vehicle, and reported to a network controller. Such varied values of PIDs during the normal operation of the vehicle, while the journey is underway, are termed dynamic values, and can be used to infer and determine that the vehicle journey is 'underway', and that the journey status has changed from 'ended' to 'underway'. Typically, the response returned by a network to a query of a parameter to the network, is sent, and received by the controller, within a brief period of time, termed a response time, of up to about 500 milliseconds (msec), more typically up to a response time selected from the group consisting of 250 msec, 200 msec, 100 msec, and 50 msec.

In an aspect of the invention, a first predetermined monitoring parameter can be selected from the group consisting of RPM, Vehicle Speed, and RUNTIME. In a further aspect of the invention, the first predetermined monitoring parameter can be selected from the group consisting of the PIDs listed in Table A. In yet another aspect of the invention, a second additional one or more predetermined monitoring parameter can be selected from the group consisting of the PIDs listed in Table A. The second additional one or more predetermined monitoring parameter can also be selected from the group consisting of RPM, Vehicle Speed, and RUNTIME. The second additional one or more predetermined monitoring parameter is typically a different parameter than the first predetermined monitoring parameter.

The return by the network of non-repeating or non-identical, non-zero values of fuel pressure, fuel delivery rate, vehicle speed, and other parameters, in response to querying using the parameter PIDs, can be used to infer and determine that the vehicle journey is 'underway'. For example, the parameter "RUNTIME' can infer that a vehicle's journey status has changed from 'ended' to 'underway' when a non-zero value is returned after the RUNTIME value has been zero and the journey status is 'ended'.

For example, in the case of an engine's revolutions per minute (RPM), a sensor in the engine detects repeatedly and continuously the engine's actual RPM, and provides or reports it to the vehicle network. When a query for RPM is received, the network reports a value representative of the actual engine RPM, termed a "dynamic value". When the ignition key of a vehicle with an internal combustion engine (ICE) is turned to 'off', the engine stops running and the actual RPM goes to zero. In some makes and models of vehicles, the response value of the vehicle network to a query for RPM is immediately zero as a direct result of the RPM sensor detecting that the actual RPM is zero. But, for some makes and models of a vehicle, after the engine with an ICE is turned 'off' and the engine stops running, it has been learned that the response value of the vehicle network to a query for RPM may not immediately be zero, but rather may be an identical non-zero value, from one query of the RPM PID to the next query, or over the several next queries, of the RPM PID. The identical non-zero value may be the last dynamic value of the PID just before the engine or ignition is turned off. Thus, the response values for RPM may be a series of identical, non-zero RPMs, despite the actual engine RPM having gone to zero. The response by a network of two or maybe three identical non-zero parameter values for any given series of queries, is very rare, though maybe not impossible, during normal vehicle operation while the vehicle journey is underway. However, three, four, five, or more successive identical non-zero dynamic parameter values would be extremely improbably, if not impossible, in real-world operation. Such a sustained response pattern might therefore reasonably imply a journey 'ended' status in certain ICE vehicles.

For other makes and models of a vehicle, after the engine with an ICE is turned 'off' and the engine stops running, the response of the vehicle network to a query for RPM may go to a value of zero but only after a period of time of up to 30 seconds (after engine shutdown) during which time response value may be constant (identical series of non-zero values as mentioned previously) or may increment in value.

And for other makes and models of a vehicle, after the engine with an ICE is turned 'off' and the engine stops running, the vehicle network simply stops replying to the parameter query; no response is given by the network when queried.

Another type of vehicle, a hybrid vehicle, has both an electric motor (power system) and a gasoline- (or diesel-) powered IC engine that is turned off (RPMs go to zero) by the vehicle's control systems when the vehicle is powered by the electrical motor. Yet another type of vehicle, an All-Electric car, has no internal combustion engine (and therefore reports no Engine RPM parameter value). And co-called "Start/Stop vehicles" turn off the internal combustion engine if the vehicle is stopped for an extended period of time in transit. A portable controller device, and a method, of the present invention is useful for inferring and/or confirming the journey status of a vehicle that is selected from the group consisting of a vehicle with an internal combustion engine, a hybrid vehicle, and a start-/stop-equipped vehicle. Typically such vehicle also is of a make and model that complies with OBD-II standards or equivalent networking standard.

One can understand and appreciate, based on the above cases, that querying solely for a "zero" value of RPM as an indication that the ignition has been turned 'on' or 'off', or that the journey status is 'underway' or 'ended', may be sufficient for some makes and models of vehicles including vehicles with an ICE, a start/stop vehicle, and a hybrid vehicle, but would not accurately imply vehicle journey status for a broader number of, if not all, types (including vehicles with an ICE, a start/stop vehicle, and a hybrid vehicle), makes and models of vehicles, such as would be required of a commercial, consumer product for determining vehicle journey status by querying a vehicle network.

Another parameter example is the parameter Run Time Since Engine Start (or "RUNTIME"). RUNTIME has been mandated (by law or regulation) to be set to zero upon engine OFF state. Inclusion of the parameter RUNTIME as an engine operating parameter can enable the portable controller device to be used with a broader variety, make and model of vehicle to indicate engine or vehicle operation status and journey status. Nevertheless, it has been determined that some vehicle manufacturers set the Run Time to zero immediately upon engine shutdown, while some vehicle manufacturers simply stop replying to the parameter query, and others vehicle manufacturers set the Run Time to zero but not immediately, and rather up to 30 seconds or longer after engine shutdown. In the interim the value either is not replied to, or remains constant, or can continue to increment. In addition, it has been learned that an incrementing value for RUNTIME, reported in seconds, may not be updated and reported to the network at each increment, and may only be reported every 8-10 seconds of operation, such that successive RUNTIME values returned after querying may be identical values over a period of several seconds of time, and then may increment in value by the duration of said period (that is, 8-10 seconds) at the next value returned.

The parameter Vehicle Speed is reported over the vehicle network as the vehicle's actual moving velocity or speed. Ordinarily, a vehicle during a journey may on numerous occasions and for extended times be stationary (e.g., at a stop sign or stop light). Consequently, a vehicle speed of zero is ordinarily not a useful or reliable parameter to indicate that a journey has 'ended'. Each make of vehicle has its own mechanism(s) for detecting the vehicle's speed, and for reporting or displaying the vehicle speed. Nevertheless, inclusion of the parameter Vehicle Speed as a vehicle operating parameter enables the portable controller device to be used with a broader variety and make of vehicle for implying vehicle journey status. Numerous type, makes and models of vehicles will fail to return a response to a query once the vehicle has been turned off and the journey has 'ended'. It has been determined that Vehicle Speed reporting can vary between various manufacturers, and by itself may not be a reliable indicator of journey status. For example, one major manufacturer's vehicles report vehicle speed as a non-zero value over the CAN network even at initial vehicle engine start when the vehicle is stopped (not moving) and the transmission is in 'Park'. However, in a large number of types, makes and models of vehicles, the PID Vehicle Speed fails to return a response upon query when the vehicle has been turned off (the engine has been turned off or powered down, and the ECU system shutdown.

Use of Parameter Values to Infer and Determine Vehicle Journey Status

Given these learnings, it has been determined that queries using standard PIDs and proprietary, non-standard, or make- or model-specific PIDs generate characteristic responses from a vehicle network when queried immediately after the vehicle has been turned off (the engine has been turned off or powered down, and the ECU system shutdown), and a journey has ended: (1) a returned parameter value (or series of parameter values) can be immediately zero; or (2) a returned parameter value (or series of parameter values) can be zero, but possibly only after a period of time of 30 seconds or more; or (3) a repeated parameter value (or series of parameter values) can be an identical, non-zero value; or (4) the vehicle network simply stops replying to the query and no response is received.

Successive queries of PIDs after the vehicle journey has ended may return successive identical response values, which can be either zero, or non-zero identical values representing the last "real-time" parameter generated by the vehicle network. If a sufficient number of successive, identical response values for a PID are received, or no response is received at all, one can infer or predict, for certain PIDs, with very high certainty, that the vehicle network is no longer returning real-time "detected" (or "dynamic") response values for these PIDs, and from which one can infer that the engine or its ignition system has been turned off, and that the vehicle and the driver have arrived at the destination and the journey status is ended.

A list of standard vehicle operation parameters as identified by their Parameter Identifier (PID) is shown in Table A, on the last page of this description. Parameters can include, without limitation, the fuel delivery rate, the engine rpm, the engine oil pressure, the vehicle's speed (typically represented as miles per hour or 'mph', or kilometers per hour), run time since engine start, fuel delivery pressure, intake manifold absolute pressure, throttle position, oxygen sensor voltage, engine coolant temperature, fuel trim, and mass air flow (MAF) air flow rate.

Although a single parameter of the vehicle's operation can be used for this inference, as explained by way of detailed examples above, the reliability of the inference of journey status ('underway' or 'ended') is improved by using a plurality of the parameters, including two parameters, three parameters, four parameters, or more, and by querying for and retrieving a plurality of parameter values from the network.

For example, in a certain class of vehicles, one might query Parameter 04 (Engine Load) in combination with Parameter 31 (Run Time Since Engine Start) to evaluate journey status.

In another class of vehicles, one might query Parameter 10 (Fuel Pressure) only if Parameter 03 (Fuel System Status) returned a valid response indicating an ICE motor is present; meanwhile Parameter 00 (supported PIDs) can be queried to validate continued Electronic Control Unit (ECU) operation from which vehicle journey status might be inferred.

It can be readily seen that a multitude of scenarios are possible that would allow reliable detection in near real time of vehicle journey status. Each scenario would involve the querying of one or more parameters as listed. The most useful parameters would vary depending on the class of vehicle queried.

A device targeted to just a small class or a single manufacturer's vehicle can determine the vehicle' journey status with a smaller subset of parameters, while giving up the ability to function properly across a wide range of types, makes and models of vehicles. A more general portable controller device, suitable for use in several or all types of vehicles, and across a wider range of vehicle makes and models, requires querying of a plurality of parameters to allow accurate vehicle journey status inference. This use of multiple parameters accommodates the variations that exist from vehicle to vehicle (make and models) in how stringently the vehicle's network adheres to the OBD-II standards in replying to queries.

In addition, real-world use requires that multiple responses that imply journey status be received before a particular journey status is confirmed. In real world operation, the network itself and the various on-board ECUs are busy processing queries and parameter values in the ordinary course of the operating the vehicle. The operation can include emergency or "high priority" events during which an on-board ECU may repeatedly request important operating parameter information about the vehicle and its operation. Excessive querying of the network should be avoided in order to not interrupt or overload the network during such high priority events. Vehicle ECUs can "reboot" or "reset" from time to time during a driving cycle while the journey is 'underway', or vehicle network responses are missed or delayed due to higher priority network traffic. The ECU reset will complete within a very short time, typically less than one second, and usually less than 0.6 seconds. Although these ECU resets are not frequent, they occur in most every vehicle in response to any number of conditions experienced by the ECU. When an ECU resets, a queried PID response to that ECU fails to return a respond. Any failure of the system to return a response to a PID query during an ECU reset cycle might infer falsely that the vehicle had gone from an 'underway' state to an 'ended' state. Thus, the controller and the programming needs to test the system by querying the same (or other) PID for a period of time or for a number of queries sufficient to distinguish an ECU 'reset' from a journey status changing to 'ended', and to avoid a false determination of journey 'ended' state.

An effective real-world system to infer vehicle journey status should take these facts into account and gracefully handle deviations from expected responses using appropriate software algorithms.

In general, to reliably and quickly detect that the status of a vehicle that is 'underway' has changed to 'ended', more than one PID ought to be queried. When a value is returned by the network from a PID that can be used to infer a state or status of the journey as 'ended' (an initial returned value), the controller immediately repeats the query of that particular parameter in order to confirm the inferred state. When there is no response (absence of a response) to a query of a PID, the controller queries the PID one or more additional times, to determine whether the vehicle has gone from an 'underway' state to an 'ended' state, or has experienced an ECU 'reset'.

An effective real-world system also needs to monitor the responses to the queries, and to confirm that the responses indicate that the journey status has changed from 'underway' to 'ended', within an amount of time that permit the system to issue an alarm or to take other action as appropriate. In one aspect of the invention, the confirmation of the 'ended' state is made within an amount of time sufficient to ensure that an alarm is emitted to catch the attention of the driver of the vehicle before the driver departs the vehicle. Preferably, that amount of time is three seconds or less, and preferable two seconds or less, including about a second or less.

The controller is configured to operate in a first mode, denoted a monitoring mode, where the querying of PIDs comprises continuously repeating a predetermined or random pattern of one or a plurality of PIDs (monitoring parameters), preferably at all times, while the vehicle journey is 'underway'. In the monitoring mode, each response to a queried parameter, or lack thereof, is evaluated or tested to determine if the response infers that the vehicle journey may have changed from 'underway' to 'ended', by comparing the response to an inferring response or parameter value selected from a group or a set of inferring responses or parameter values. The group or set of inferring responses or parameter values can include or consist of: (1) the absence of a response to a parameter query, (2) a zero value, and (3) a non-changing (or identical), non-zero value. A response to the query of any of the one or more PIDs (monitoring parameters) can be any one or more of the group or set of inferring responses or parameter values.

In the monitoring mode, whenever any parameter PID is queried and no reply is received, that PID can be flagged as a 'candidate parameter". In one aspect of the invention, the lack of response to a query is a prima facie inference that an ECU has shut down, that the vehicle has been shut down, and that the journey has 'ended' (barring an ECU 'reset').

In the monitoring mode, when a value returned for a monitored parameter has a value of zero ("0"), then that PID may be flagged as a 'candidate parameter", depending upon the particular PID used. In some makes and models of vehicles, a particular PID response value of zero may infer an 'ended' state, while in other makes and models of vehicles, the same value of zero may not. For example, in most makes and models of vehicles powered by internal combustion engines (ICEs), a returned value of zero for the PID for engine RPM can infer 'ended' state, while conversely a returned value of zero for the PID for Vehicle Speed occurs when the vehicle stops at a red light. In a hybrid vehicles, a returned value of zero for the PID for engine RPM does not infer 'ended' state, since the hybrid vehicle may be proceeding on its journey using only battery power. Consequently, the response of zero to a query for the PID for RPM is not sufficiently reliable for all makes and models and types of vehicles. For many other parameters, a returned value of zero may be rare at any time; for example, for air or coolant temperature, while for other parameters, a returned value of zero may be possible when the vehicle has been shut down; for example, for fuel rate or oil pressure.

In the monitoring mode, when the value returned for a monitored parameter is identical to the value last returned for the same monitored parameter, then that PID can be flagged as a 'candidate parameter". In many or most makes and models of vehicles, a particular PID response value that is identical to the value last returned for that particular PID infers an 'ended' state, because the likelihood of consecutive values for two dynamic parameter values during normal operation is statistically rare. In the case of the parameter RUNTIME, it has been determined that once a vehicle journey is 'underway', the dynamic value (in second) returned for the PID RUNTIME may not increment and will return an identical value for a span of time of up to 10 seconds, and with the next response will increment or catch-up to the expected actual value, and continue to return such actual value for another span of time. Consequently, for RUNTIME, a returned non-zero value that is identical to the last returned for the PID RUNTIME cannot be relied upon as a candidate parameter. On the other hand, some makes and models of vehicles will return a value of zero for the parameter RUNTIME either immediately or after a span of time once the vehicle has been shut down.

Once any monitoring parameter is flagged as a candidate parameter, the controller can be configured to immediately begin operating in a second mode, denoted a confirming mode.

In a first embodiment of a confirming mode, the microprocessor is configured to promptly or immediately query the candidate parameter one or more times sequentially for a predefined term, and to test each response to the query of the candidate parameter, by comparing such response or response value to the set of inferring responses or parameter values. The predefined term can be a predefined number of successive queries only of the candidate parameter, or can be any number of successive queries only of the candidate parameter within a predefined time period. For example, the microcontroller is programmed to "hit" or query the candidate parameter a plurality of successive time, for example, five (5) successive times, with each query occurring each 100 msec, thus taking about 500 msec. The period of time between each query can be selected between about 100 msec to about 500 msec, though the period of time can be shorter or longer depending upon circumstances. The plurality of successive times can be up to ten times, although more can be used. Or the microcontroller is programmed to "hit" the candidate parameter two or more times within a time period of 0.6 seconds, where each query can be made every 200 msec, thus querying the candidate parameter at least three times. The time period can be at least about 0.5 seconds, and up to one second, including up to 2 seconds, or up to 3 seconds, and up to 10 seconds, although more can be used.

Each confirmational query of the candidate parameter is tested in succession. If the response to the first query of the candidate parameter in the confirming mode is one of the inferring responses (or lack thereof) or parameter values, and more particularly the same inferring response or parameter value that had flagged the candidate parameter, the inference remains and the next successive conformational query is made. If each of the conformational queries during the predefined term is the same inferring 'lack of response' or inferring parameter value, then the inferred state of the vehicle journey is confirmed and is identified as 'ended'. On the other hand, if any of the conformational queries returns a parameter value that is not the same inferring response (for example, is a dynamic and non-identical, non-zero response value), then the confirming mode is canceled, and the microcontroller and the system returns to the monitoring mode.

In another embodiment of a confirming mode, after the first candidate parameter has been re-queried one or more times and each response returns the same inferring response or parameter value that flagged the candidate parameter, the system can then "hit" a second of the other monitoring parameter, as a second candidate parameter, to determine or confirm that the response to such other monitoring parameter is also an inferring response or parameter. If each of the conformational queries of the second candidate parameter is a same inferring response or parameter value, then the state of the vehicle journey can be identified as 'ended'. On the other hand, if any of the conformational queries of the second candidate parameter returns a parameter value that not the same inferring response (for example, is a dynamic and non-identical, non-zero value), then the confirming mode is canceled, and the microcontroller and the system returns to the monitoring mode.

In yet another embodiment of a confirming mode, the monitoring mode can be continued one or more cycles of the monitoring parameters, to determine if a second of the plurality of monitoring parameters is flagged as a candidate parameter. A determination that at least two of the monitoring parameters are also candidate parameters can be used to decide that the vehicle journey is 'ended'.

Of note, beyond the mandated PIDs listed in Table A, various manufacturers respond to hundreds and in some cases thousands of proprietary PIDs on their vehicle networks. For a device targeted at a specific manufacturer's vehicles, it is possible to duplicate the above functionality with manufacturer-specific PIDs in place of the mandated PIDs listed.

A non-limiting example of a monitoring mode and a determining mode by a controller device on a vehicle for inferring and determining the journey status of the vehicle is illustrated in Table B (FIG. 1). Table B shows the network traffic between a controller device plugged into the OBD-II port of a vehicle and the vehicle's ECUs. The portable controller device queries the vehicle network in a monitoring mode with a repeating cycle of PIDs consisting of RUNTIME, VEHICLE SPEED and RPM in series, at 100 msec each, continuously and/or successively during the 'underway' journey of the vehicle. In the monitoring mode, the querying includes monitoring the parameter 'RPM' for an inferring parameter value of zero ("0"). The querying can further include monitoring the other additional parameters 'RUNTIME' and 'VEHICLE SPEED' independently and selectively for any one or more of the set of inferring responses or parameter values. At an arbitrary time near the end of the journey, shown at time 0, the controller queries the network in a cycle 'a' of RUNTIME, VEHICLE SPEED and RPM over the time period 0-300 msec. During a cycle 'b' in the monitoring mode, the query of RPM returned a value of zero, which was compared with and found to fulfill the inferring parameter value for RPM being zero. The controller responds by initiating a confirming mode in which the same RPM PID is queried successively five additional times, each query within 100 msec beginning at time 600 msec. The network returns a value of zero for each of the five queries of the RPM PID, and the controller confirms the inference and determines that the vehicle journey has changed from 'underway' to 'ended' at time 1100 msec. The time from the last dynamic value of parameter RPM ("rpm a") to the determination that the journey has ended, is about 700 msec. On the other hand, if any of the responses to the five successive queries of RPM was not a zero, then the controller will terminate the confirming mode and will reinitiate the monitoring mode.

Another non-limiting example of a monitoring mode and a determining mode by a controller device on a vehicle for inferring and determining the journey status of the vehicle is illustrated in Table C (FIG. 2). Table C shows the network traffic between a controller device plugged into the OBD-II port of a vehicle and the vehicle's ECUs. The portable controller device queries the vehicle network in a monitoring mode with a repeating cycle of PIDs consisting of RUNTIME, VEHICLE SPEED and RPM in series, at 100 msec each, continuously and/or successively, during the 'underway' journey of the vehicle. In the monitoring mode, the querying includes monitoring the parameter 'RPM' for an inferring parameter value of an identical, non-zero value. The querying can further include monitoring the other additional parameters 'RUNTIME' and 'VEHICLE SPEED' independently and selectively for any one or more of the set of inferring responses or parameter values. At an arbitrary time near the end of the journey, shown at time 0, the controller queries the network in a cycle 'a' of RUNTIME, VEHICLE SPEED and RPM over the time period 0-300 msec, with the value for RPM being a non-zero value "rpm a". During a cycle 'b' in the monitoring mode, the query of RPM returned an identical value of "rpm a", which was compared with the preceding value of RPM and found to fulfill the inferring parameter value of the RPM PID, being a first identical, non-zero value. The controller responds by initiating a confirming mode in which the same RPM PID is queried successively four additional times, each query within 100 msec beginning at time 600 msec. The network returns an identical non-zero value of "rpm a" for each of the four additional queries of the RPM PID, and the controller confirms the inference and determines that the vehicle journey has changed from 'underway' to 'ended'. The time from the last non-identical dynamic value of parameter RPM (time=0 msec) to the determination that the journey has ended, is about 1100 msec. On the other hand, if any of the responses to the four successive queries of RPM was not an identical non-zero value of "rpm a", then the controller will terminate the confirming mode and will reinitiate the monitoring mode.

A further non-limiting example of a monitoring mode and a determining mode by a controller device on a vehicle for inferring and determining the journey status of the vehicle is illustrated in Table D (FIG. 3). Table D shows the network traffic between a controller device plugged into the OBD-II port of a vehicle and the vehicle's ECUs. The portable controller device queries the vehicle network in a monitoring mode with a repeating cycle of PIDs consisting of RUNTIME, VEHICLE SPEED and RPM in series, at 100 msec each, continuously and/or successively, during the 'underway' journey of the vehicle. In the monitoring mode, the querying includes monitoring the parameter 'VEHICLE SPEED' for an inferring parameter response of "no response". The querying can further include monitoring the other additional parameters 'RPM' and 'RUNTIME' independently and selectively for any one or more of the set of inferring responses or parameter values. At an arbitrary time near the end of the journey, shown at time 0, the controller queries the network in a cycle 'a' of RUNTIME, VEHICLE SPEED and RPM over the time period 0-300 msec. During a cycle 'b' in the monitoring mode, the query of RPM returned a value of zero, which was compared with and found to fulfill the inferring parameter value for RPM being zero. The controller responds by initiating a confirming mode in which the same RPM PID is queried successively five additional times, each query within 100 msec. The network returns a value of zero for each of the five queries of the RPM PID, and the controller confirms the inference and determines that the vehicle journey has changed from 'underway' to 'ended'. The time from the "no response to the parameter VEHICLE SPEED to the determination that the journey has ended, is about 700 msec. On the other hand, if any of the responses to the five subsequent successive queries of VEHICLE SPEED was a parameter value (not a "no response"), then the controller will terminate the confirming mode and will reinitiate the monitoring mode.

Another non-limiting example of a monitoring mode and a determining mode by a controller device on a vehicle for inferring and determining the journey status of the vehicle is illustrated in Table E (FIG. 4). Table E shows the network traffic between a controller device plugged into the OBD-II port of a vehicle and the vehicle's ECUs. The portable controller device queries the vehicle network in a monitoring mode with a repeating cycle of PIDs consisting of RUNTIME, VEHICLE SPEED and RPM in series, at 100 msec each, continuously and/or successively, during the 'underway' journey of the vehicle. In the monitoring mode, the querying includes monitoring the parameter 'RUNTIME' for an inferring parameter value of an identical, non-zero value. The querying can further include monitoring the other additional parameters 'RPM' and 'VEHICLE SPEED' independently and selectively for any one or more of the set of inferring responses or parameter values. At an arbitrary time near the end of the journey, shown at time 0, the controller queries the network in a cycle 'a' of RUNTIME, VEHICLE SPEED and RPM over the time period 0-300 msec. The parameter RUNTIME is returning a parameter value "x" over a period of time. During a cycle 'b' in the monitoring mode, the query of RUNTIME returned a value of zero, which was compared with the preceding value of RUNTIME as value "x" and found to fulfill the inferring parameter value of the RPM RUNTIME, being a zero value following a non-zero value. The controller responds by initiating a confirming mode in which the same RUNTIME PID is queried successively four additional times, each query within 100 msec beginning at time 700 msec. The network returns a zero value for each of the four additional queries of the RUNTIME PID, and the controller confirms the inference and determines that the vehicle journey has changed from 'underway' to 'ended'. The time from the last dynamic value of parameter RUNTIME (time=400 msec) to the determination that the journey has ended, is about 700 msec.

A further non-limiting example of a monitoring mode and a determining mode by a controller device on a vehicle for inferring and determining the journey status of the vehicle is illustrated in Table F (FIG. 5). Table F shows the network traffic between a controller device plugged into the OBD-II port of a vehicle and the vehicle's ECUs. The portable controller device queries the vehicle network in a monitoring mode with a repeating cycle of PIDs consisting of RUNTIME, VEHICLE SPEED and RPM in series, at 250 msec each, continuously and/or successively, during the 'underway' journey of the vehicle. In the monitoring mode, the querying includes monitoring the parameter 'RPM' for an inferring response of "no response". The querying can further include monitoring the other additional parameters 'RUNTIME' and 'VEHICLE SPEED' independently and selectively for any one or more of the set of inferring responses or parameter values. At an arbitrary time near the end of the journey, shown at time 0, the controller queries the network in a cycle 'a' of RUNTIME, VEHICLE SPEED and RPM over the time period 0-750 msec. During a cycle 'b' in the monitoring mode, the query of RPM returned 'no response', which was compared with and found to fulfill the inferring response for RPM of "no response". The controller responded by initiating at t=1000 msec a confirming mode in which the same RPM PID is queried successively additional times, for a pre-determined term of 1200 msec. The network fails to respond for three queries of the RPM PID, but on the fourth query at t=1750 msec, the RPM PID returns a dynamic value of 'rpm c', from which can be inferred that the ECU had 'reset'. The controller and its programming cancels the confirming mode, maintains the vehicle journey as 'underway', and initiates the monitoring mode.

In an embodiment of the invention, a first predetermined monitoring parameter is RPM, and the predetermined inferring response or parameter value that is compared against the response by the network to the query for RPM can include an absence of a response to the query of said monitoring parameter, a zero value, and an identical non-zero value, and when any response by the network to the query for RPM is or satisfies an absence of a response to the query of the monitoring parameter, or a zero value, or an identical non-zero value, then the RPM parameter is defined as a candidate parameter, and the predetermined inferring response or parameter value that has been satisfied is selected as the predetermined inferring response or parameter value for a confirming mode.

A second predetermined monitoring parameter is Vehicle Speed, and the predetermined inferring response or parameter value that is compared against the response by the network to the query for Vehicle Speed includes an absence of a response to the query of the monitoring parameter, and an identical non-zero value, and when any response by the network to the query for Vehicle Speed is or satisfies an absence of a response to the query of said monitoring parameter, or an identical non-zero value, then the Vehicle Speed parameter is defined as a candidate parameter, and the predetermined inferring response or parameter value that has been satisfied is selected as the predetermined inferring response or parameter value for a confirming mode.

A third predetermined monitoring parameter is RUNTIME, and the predetermined inferring response or parameter value that is compared against the response by the network to the query for RUNTIME includes an absence of a response to the query of said monitoring parameter, and a zero value, and when any response by the network to the query for RUNTIME is or satisfies an absence of a response to the query of said monitoring parameter, or a zero value, then the RUNTIME parameter is defined as a candidate parameter, and the predetermined inferring response or parameter value that has been satisfied is selected as the predetermined inferring response or parameter value for a confirming mode.

It should be understood that in another (or other suitable parameter) example of the monitoring mode, two or more inferring parameter values can be used concurrently. For example, during a monitoring mode, the parameter 'RPM' (or other suitable parameter) can be monitored for an inferring parameter value of both zero and an identical, non-zero value, the parameter 'VEHICLE SPEED' (or other suitable parameter) can be monitored for an inferring parameter response of "no response", and the parameter 'RUNTIME' can be monitored for an inferring parameter response of zero value, following a dynamic non-zero value.

The Portable Controller Device

The portable controller device can include an interface that plugs into the OBD-II port, and a housing that contains the hardware and programming for querying the vehicle network for the predetermined parameters, using software or a network interpreter chip, or both. The housing can also contain an RF or other signal transmission receiver, RF or other signal transmission transmitter, a combined transmitter/receiver device (transceiver), and an alarm signal generator. The alarm signal generator can include the alarm, or can communicate with the vehicle to generate the alarm, wherein the alarm can include an audible voice, music, or tone, a buzzer, the vehicle's car theft alarm, the vehicle ignition, the vehicle heater, the vehicle air conditioner, the vehicle power door system, the vehicle power window system, the vehicle sound system or radio, the vehicle horn, the vehicle light systems including the compartment lights, headlights, warning lights, and taillights, the vehicle information display, and the vehicle wireless, cellular or satellite communication system. The interface can be housed in the housing, or can be connected to the housing with a wire connection.

The alarm signal generator of the portable controller device can generate the alarm signal when the status of the buckle status signal is buckled and the status of the vehicle journey has changed to 'ended' for beyond a predetermined time period. The alarm then responds to the alarm signal after a second predetermined time period. The status of the vehicle's battery system can include the battery voltage potential, the voltage signal quality of the rectified DC, and a vehicle operation parameter. The buckle status signal can be a radio frequency signal, typically broadcasted in a range between 400-900 MHz, for example, 433 MHz, that includes an encryption code, a unique identity (ID) code for the buckling detector, a "buckled" and/or "unbuckled" signal code, and optionally a battery voltage check code, an ambient temperature check code, and a CRC code.

The microcontroller of the portable controller device (or on-board native controller device) can be configured to query the vehicle network, by software or by control of a network interface chip, for the selected parameters using PIDs. The microcontroller can include a stored program fixed in non-transient media. The microcontroller can be configured to query for each selected parameter sequentially or intermittently. The microcontroller can be configured to query for one or more selected parameters more frequently than other selected parameters. The microcontroller can be configured to not query for a selected parameter unless a preselected value is returned for another parameter that has been queried. The microcontroller can also be configured to minimize the frequency and duration of queries to the vehicle network so as to minimize or avoid overload or delay other operations or vital functions performed by the vehicle network.

FIG. 6 shows a portable controller device 50 that plugs into the OBD-II port 100 of the vehicle. A child safety seat 10 is shown in a rear passenger seat of the vehicle, with a buckle signaling device 11 that includes a buckling detector for detecting the buckling, and the unbuckling, of a latch into the buckle, a buckle status processor, and buckle status signal transmitter for transmitting a wireless signal when the status of the buckling changes from unbuckled to buckled, and buckled to unbuckled. The buckling detector can be integral with, or separate from, the restraint mechanism associated with the child safety seat. The buckle status signal is typically a wireless signal, and can include a radio frequency (RF) signal that contains at least the restraint device identification information. Non-limiting examples of wireless signals and systems include Bluetooth® and Bluetooth® LE (Blutooth® Smart) operating in the 2.4 GHz range, and RF transmitters and transceivers in the 400-900 MHz range.

Figure 7C:
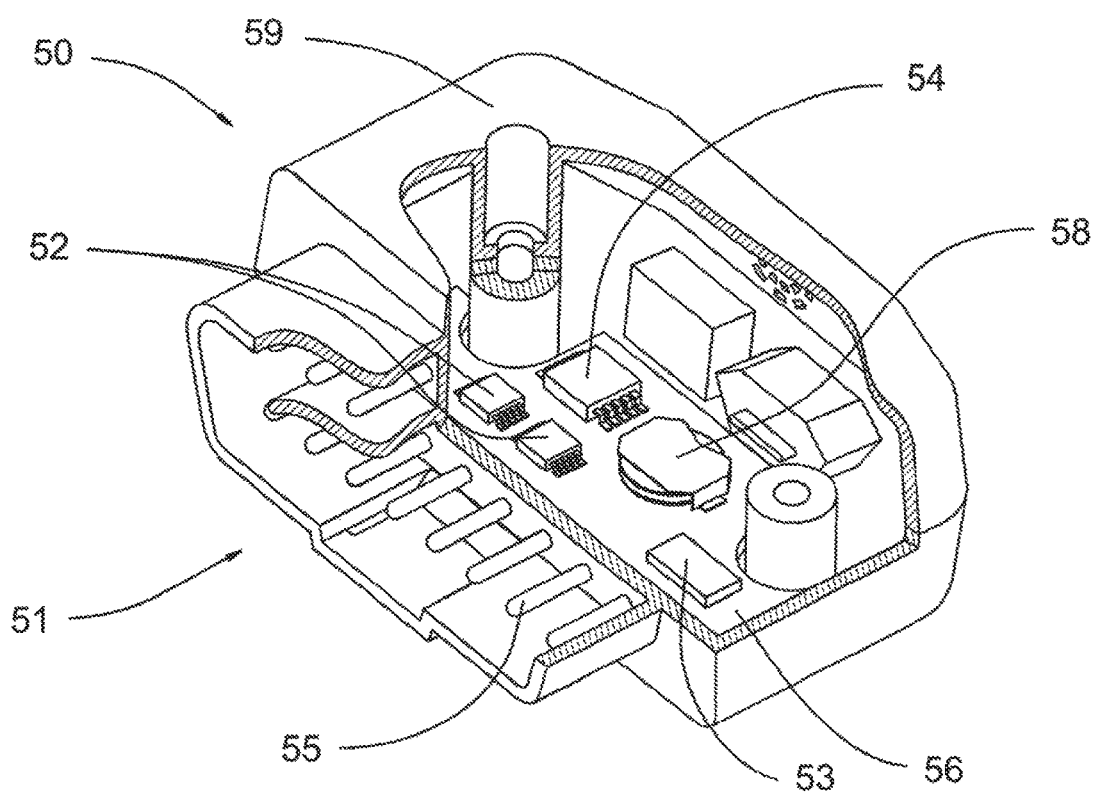
FIG. 7A-7C illustrate the portable controller device of the present invention with a portion of the housing removed to reveal the microcontroller, buckle signal transmitter, and buckle status processor and other components.
Figure 7A:
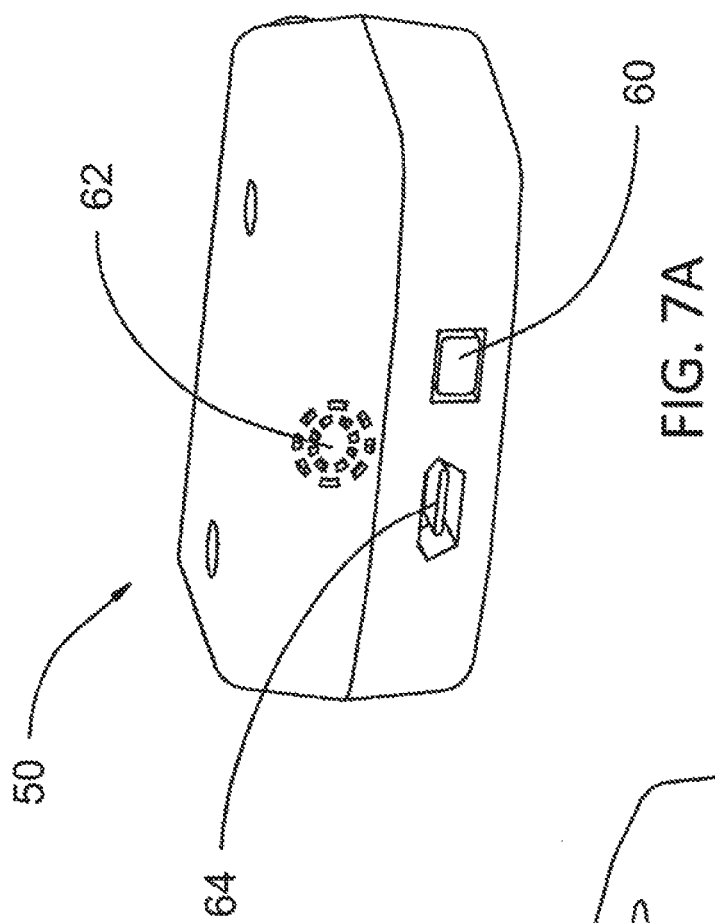
Figure 7B:
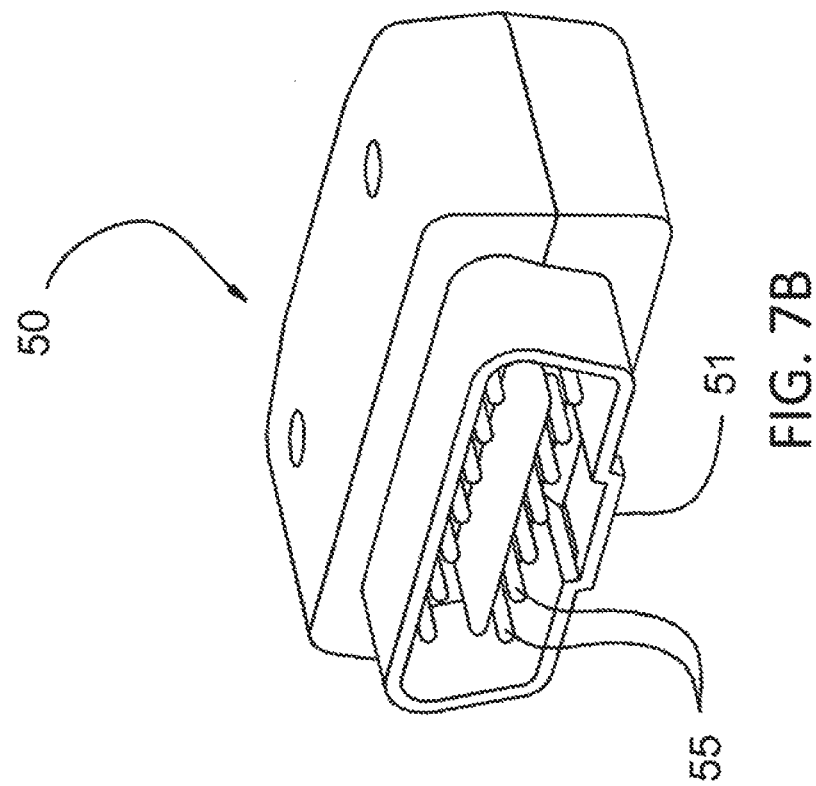
Figure 8:
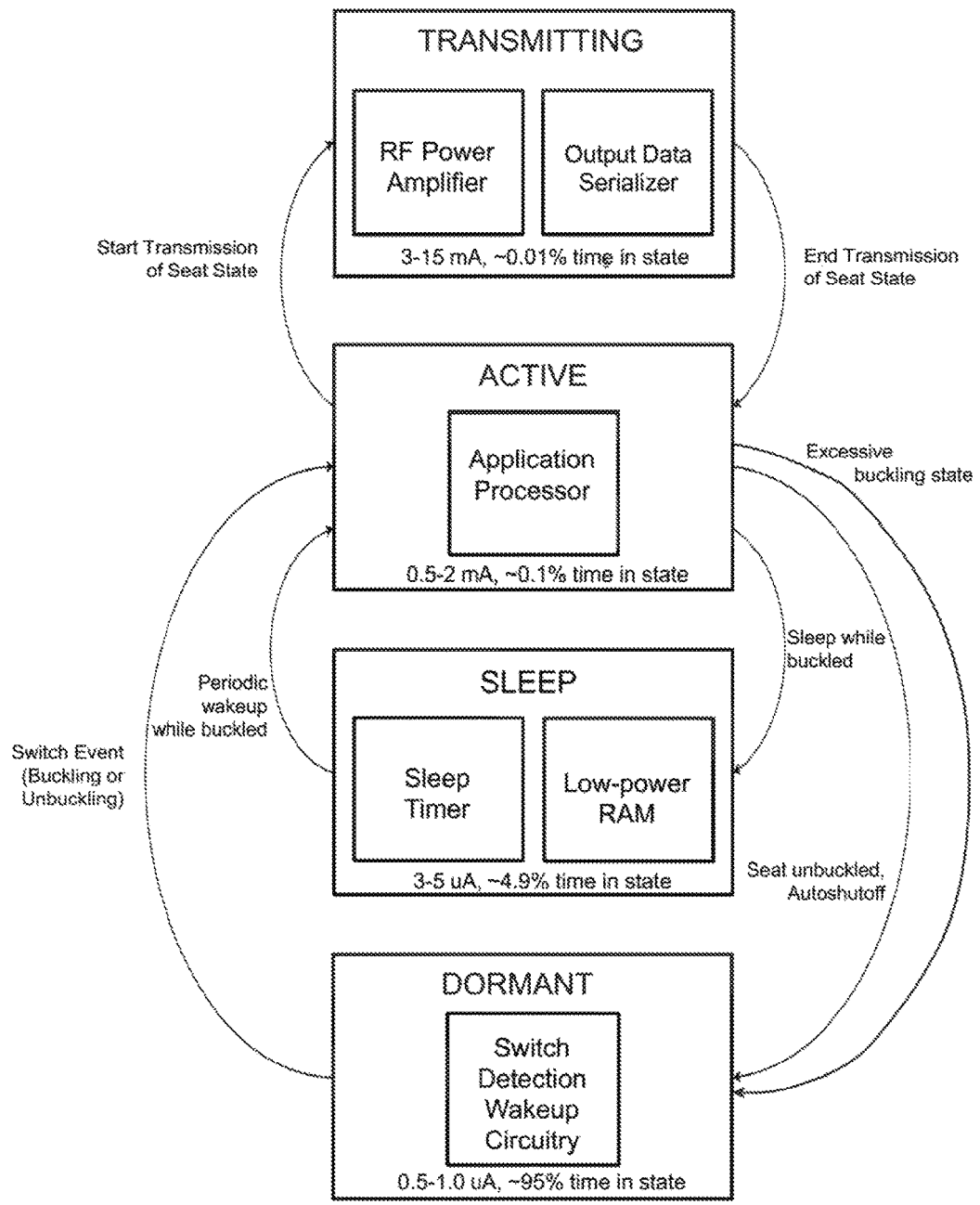
FIG. 8 shows a flowchart showing the management of power consumed by the child buckling detector depending on the buckle state and changes in buckle state.

FIGS. 7A-7C illustrate a portable controller device 50. The functional components of the portable controller device 50 are enclosed within a housing 59 or covering. The device 50 can include a means for communicating with the vehicle's onboard network (CAN or other network) through the OBD-II port, illustrated as a network interface chip or transceiver 53 mounted on a PCB board 53. A 16-pin Data Link Connector (DLC) 51 provide the controller 50 with an interface comprising a plurality of pins 55, that plugs into the On-Board Diagnostic (OBD)-II vehicle port. After the DLC is plugged in to the OBD-II port, 12-volt power is delivered to the portable controller device 50 from the vehicle's electronics system across a specific pair of pins to the vehicle battery and to ground. The 12-volt current typically runs through a voltage regulator (not labeled) to output between 3 and 5 volts direct current, to directly power a microcontroller 52 and other components of the portable controller device 50. An auxiliary battery 58 is optionally included in the circuitry to power the microcontroller 52 and other components when the controller 50 is unplugged from the OBD-II port ('off-OBD'). The device 50 can also optionally include a transceiver 54 that can transmit signals to and receive signals from other components, including signals pertaining to the presence of a child or the restraint buckle status of a child safety seat. The transceiver 54 can also broadcast, in at least partial response to the inferred status of the driver or the journey as determined by the controller, a message, an alarm, or warning signal, to the driver, to another device, or to a communication system.

The microcontroller 52 establishes an interface with a network of the vehicle, for example a CAN network, using a network interpreter chip that is connected through standard pins 55, for example standard Pins 6 and 14 for communicating with the CAN network. As described above, the microcontroller 52 is programmed to query the vehicle network with one or more of a parameter ID (PIDs) of vehicle operation which will result in a response from the vehicle network indicating a value for the vehicle's queried operating parameter. The microcontroller 52 then includes programming to infer from the values for the vehicle's queried operating parameters, whether the vehicle is 'underway', or the journey has 'ended'.

Other optional features of the portable controller device 50 can include an audio speaker 62 from which audible signals, warnings, and alarms can be emitted to the attention of the driver or other passengers or persons in the vicinity of the device or the vehicle. The device can also include a reset button 60 for returning any information in volatile memory back to a standard or factory setting, or other previously established setting or condition. The user can be permitted to add or update programming using a computer or other data-entry device that interfaces with the portable controller device wirelessly or through an updating port 64. Other optional components that can disposed on or within the housing 59 of the portable controller device 50 including a "power on" LED indicator, an operating mode LED(s), an on-board 'learn' button, a 'pause' or 'delay' button, user selection switches, as well as microcontroller pin requirements and connections.

In another embodiment of the invention, a native or on-board controller device can query the network for one or more predetermined parameters using PIDs, receive responses from the network of the parameter values, and analyze the parameter values to infer status of the vehicle journey, including as 'underway' or as 'ended'. From the inferred journey status, the on-board controller device can broadcast the inferred status of the journey to the driver, to another device or to a communication system, or can emit an alarm or warning signal in at least partial response to the inferred status to the driver or the journey. For example, a vehicle manufacturer could modify current vehicle onboard processor software and use the vehicle's remote keyless entry (RKE) antenna to duplicate the functionality of the portable onboard controller.

Preventing Vehicle Battery Drainage

A further invention is a portable controller device, and method, including a means for querying a vehicle network through the OBD-II port, and a means for monitoring the voltage potential across a vehicle's battery to ameliorate or prevent draining of the vehicle battery while allowing vehicle network querying when needed.

The portable controller device is comprised of, among other components, a) battery and ground pins to connect with the vehicle battery and ground sockets of the vehicle's OBD-II port, b) network pins (for example pins 6 and 14 in the CAN protocol) to connect with the network sockets of the vehicle's OBD-II port, c) a microcontroller programmed to manage the various components of the device, and connected to the battery and ground pins in order to monitor the vehicle battery voltage, d) a network interface chip or transceiver, controlled by the microcontroller and specific to the protocol(s) (for example CAN protocol) used by the vehicle network, and communicating with the vehicle network via the network pins, e) a voltage regulator also connected to battery and ground pins to provide power for the device, and f) other components to carry out the functions of the device, optionally including but not limited to receiver, transmitter, alarm signaling components, optional battery, etc.

The portable controller device described herein can cause drainage of a vehicle battery in at least two ways. In one way, the drainage of the vehicle battery is the direct consumption of vehicle battery power by the portable controller device, for powering of the microcontroller and other components. This is a low level of power drainage that would not drain a typical vehicle battery to a no-start state (a state where the vehicle battery is unable to turn over or crank an ICE) for many weeks. However, a second way a controller device can drain a vehicle battery is by its activation of the vehicle's Electronic Control Units (ECUs), caused by the act of querying the vehicle network for real-time response values for the at least one vehicle operation parameter.

Activation of vehicle ECUs can, in practice, drain a vehicle battery to a no-start state in as little as 24 hours if the vehicle does not enter a charging state for the vehicle battery. The ECUs of many models of vehicles will become energized when the ECU receives a query across the network, or "wake on query". This causes undesirable vehicle battery drain over a period of time after repeated, successive querying of the vehicle ECUs when the vehicle is not in an active charging state.

To preserve vehicle battery life, querying of the ECUs should be avoided when the vehicle journey status is 'ended' (not 'underway'). However, it is not possible to determine vehicle journey status without querying. Therefore, in order to recognize a vehicle 'underway' state as soon as is practical, querying should be restarted when an active charging state of the vehicle prevents battery drain.

The present invention provides for the monitoring of the vehicle battery voltage as part of a programmed logical decision tree for deciding whether and when to query the vehicle network through the network pin(s) on the controller device. The controller device can be configured to not permit querying of the vehicle network when the vehicle journey status is 'ended' (not 'underway') until the vehicle battery voltage potential rises above a predetermined level or value (for example, 12.9 volts, 13.4 volts, et al.), that implies that the vehicle's electrical system is in an active charging state.

The predetermined level above which the battery voltage potential must reach to indicate an active charging state can be about 12.8 volts or greater, including 12.9 volts or more, 13.0 volts or more, 13.1 volts or more, 13.2 volts or more, 13.3 volts or more, and 13.4 volts or more, and such as 12.8 volts, 12.9 volts, 13.0 volts, 13.1 volts, 13.2 volts, 13.3 volts, or 13.4 volts.

The controller device can include power and ground pins monitored by the microcontroller. The microcontroller, by direct control of the network interface chip or transceiver, starts or stops querying of the vehicle network based on current vehicle journey status and current battery voltage.

Of note, when the vehicle journey status is 'underway', querying is permitted to continue, regardless of the level or value of the vehicle battery voltage. This is necessary due to any number of possible power transients that may occur while the vehicle is 'underway' and the vehicle battery voltage sags to a lower than normal level, despite an active charging state, such as when electrical accessories are operated (for example, the rear window defroster, power windows, etc.), which may result in a voltage sag below the predefined lower level, and but for the vehicle's journey state being 'underway', might imply an inactive charging state. However, when the vehicle journey state has been deemed to be 'ended', the microcontroller is configured to continue monitoring the battery voltage. When the monitored battery voltage value falls to or below a second predetermined value or level that implies an inactive charging state, the microcontroller terminates any further querying of the vehicle network system via the OBD-II port. The second predetermined voltage level can be about 12.9 volts or less, including 12.8 volts or less, 12.7 volts or less, 12.6 volts or less, 12.5 volts or less, and 12.4 volts or less, and such as 12.9 volts, 12.8 volts, 12.7 volts, 12.6 volts, 12.5 volts, or 12.4 volts.

The portable or on-board native controller device is described herein for use with a chest clip that determines the buckling status of the child safety seat. There are, however, a variety of other applications and products which might be associated or used within a vehicle, which are configured to query a network of a vehicle, and which may cause vehicle battery drainage. The portable or on-board native controller device, and method for its use, can be used with any such other applications and products. Such other applications and products can include global positioning devices, vehicle driving monitors, RF jamming or disabling devices for vehicles underway, etc.

The portable or native controller device can also include a microcontroller that is programmed with, or is provided access to, and memory for storing, the vehicle's manufacture information obtained by querying the vehicle network, including the make, model, and year of manufacture of the vehicle. This information is compared with a database of known vehicle manufacture information that is stored in the non-volatile memory of the portable controller device, and the appropriate communication protocol for the vehicle is ascertained. The information associated with a given vehicle includes the protocol needed for the microcontroller to properly communicate with (that is, query and signal) the vehicle's on-board network. The communication over the vehicle's network can involve retrieval of vehicle operating state information. The communication can also actively manage various features of the vehicle functions.

The portable controller device can include an updating port as an interface for updating known vehicle manufacture information or software stored within the non-volatile memory of the portable controller device as such information becomes available or as new model years come to market. A typical updating port can include a USB port, a mini-USB port, a micro-USB port, or other similar data port.

The alarm signal can be transmitted through the OBD-II port, to initiate an alarm signal-responding feature of the vehicle based upon the vehicle model specifications stored within the controller device. Examples of an alarm signal-responding feature of the passenger vehicle can include an audible voice, music, or tone, a buzzer, the vehicle's car theft alarm, the vehicle ignition, the vehicle heater, the vehicle air conditioner, the vehicle power door system, the vehicle power window system, the vehicle sound system or radio, the vehicle horn, the vehicle light systems including the compartment lights, headlights, vehicle information display, warning lights, and taillights, and the vehicle wireless, cellular or satellite communication system, such as OnStar™.

The child-vehicle safety system for a single passenger vehicle includes at least one child seat buckle signaling device, and a portable controller device connected to the OBD-II port of such vehicle, or a vehicle-integrated onboard controller device providing the same functionality. This system provides that each of the child seat buckle signaling devices is associated with a child safety seat, and employs a buckle signaling device that broadcasts a preselected and unique buckle status signal. The buckle status signal can be automatically generated and selected by the child seat-vehicle safety system, or can be selected from a plurality of fixed signals. The buckle status signal can be identified as unique by the use of device-unique identification (ID) information conveyed within the RF message signal SS. When two or more child safety seats, with the child seat buckle signaling devices, are employed in the vehicle, the system thus provides for establishing separate and distinct buckle status signals between the portable controller device and each child seat buckle signaling device. When one or more than one child safety seats are employed in two or more different vehicles, the user can move the portable controller device from one vehicle to the next, or can use a separate portable controller device in each vehicle, wherein each separate portable controller device can be programmed to communicate independently with any one or all of the child safety seats. This allows the user the flexibility and convenience of moving a child safety seat with the child seat buckle signaling device between vehicles, without the need to re-initiate or re-install the system components.

The Child Buckle Assembly

An embodiment of the child buckle assembly is a chest clip restraint device that includes a restraint mechanism for position and securing shoulder or harness straps in position. An example of a chest clip, including the latch member and the buckle member, is a SafeGuard chest clip, available from IMMI. The chest clip can be modified to accommodate the buckling detector by forming an opening for the toggle switch in the buckle member, and securements for the PCB.

The buckling detector of the present invention can be programmed for instructing the RF transmitter to send a buckled signal when a lever arm toggles to a first position, and optionally an unbuckled signal when the lever arm toggles to a second position. Both the buckled signal and the unbuckled signal can include an encryption code, a unique identity code, the respective buckled or unbuckled signal code, and optionally a battery voltage check code and an ambient temperature check code. The encryption code is typically a 40-bit rolling code, comparable to the encryption systems used in remote keyless-entry systems of todays' automobiles, as described in "How Remote Entry Works" (http://auto.howstuffworks.com/remote-entry2.htm). The unique identity code is typically a 32-bit code that is preselected to uniquely identify the buckling detector, and therefore it uniquely identifies the chest clip and the child safety seat to the control system. The buckle and unbuckle code can be a short-bit (e.g, 1-4 bits) signal to distinguish the two signals. Alternatively a cyclic redundancy check (CRC) code can provide a means for the detection of burst errors during digital data transmission and storage of the buckle status signal. The battery voltage check code and the ambient temperature check code can be short-bit "good" or "no-good" codes, or a short-bit voltage value or short-bit ambient temperature value. The buckle signaling device is a self-powered device that does not rely upon power from the vehicle's electric system, and the on-board battery provides the sole source of power to this device. A 3-volt nickel-cadmium battery is typically sufficient to provide power to the device for several years. To minimize power requirements, the seat buckle status processor can include circuitry and controls that minimize power consumption except at the moment when the child seat buckle assembly is 'buckled' from an unbuckled state, or is 'unbuckled' from a buckled state.

In a further aspect of the invention, the at least one restraint device further includes a battery, a microprocessor, a buckling detector, a transmitter and circuitry, and programming of the microprocessor(s) suitable for the indicated function and operations described herein. Upon the buckling of the restraint mechanism, (1) the buckling detector detects the buckling state of the restraint device, and (2) awakens the microprocessor to a low power consumption Active state, from an extremely low power (Dormant) state. Once Active, (3) the microprocessor promptly causes transmission of a 'buckled' RF signal (Transmission state), and typically a brief series of 'buckled' RF signals, (4) returns to the Active state, and then (5) sleeps for a predetermined period of time (for example, 30 seconds) (Sleep state). After timed-out awakening from the Sleep state, (6) the microprocessor checks the status of the buckling detector. If the buckling detector is in the 'buckled' state, (7) the microprocessor returns to step (3) and continues; and if the buckling detector is in the 'unbuckled' state, (8) the microprocessor causes transmission of an 'unbuckled' RF signal, and typically a brief series of 'unbuckled' RF signals, and then (9) returns to the extreme low power Dormant state until such time as the restraint mechanism is again buckled, at which time the restraint device returns to step (1).

The device also incorporates an 'auto-shutoff' mode (10) that places the device into an extremely low power (Dormant) state if left buckled beyond a certain predefined interval of time, or processing cycles, that infers that the buckled device has been placed into storage (for example, 12 hours). These methods are necessary to allow for use of low cost batteries of small enough size to fit within a child seat chest clip, yet providing a functionally useful battery life (for example, up to 5 years or more, of use for 2 hours daily).

FIG. 7 shows a flowchart showing the management of power consumed by the buckling detector. While in the Dormant state, the buckling detector can be either in the 'buckled' or 'unbuckled' position. In the Dormant state, the device is consuming an ultra-low amount of power, in the range of 0.5-1.0 microamps. Under normal usage conditions, the device will reside in the Dormant state over 95% of the time. The only process functioning is the switch detection wakeup circuit, which will awaken the microprocessor from the dormant state with any change of the buckle switch position; either when an unbuckled restraint device is buckled and the buckle switch moves to the 'buckled' position, or when a buckled restraint device is unbuckled and the buckle switch moves to the 'unbuckled' position.

Upon a buckling of the restraint device (for example, as a child placed into the child seat at the start of a journey), the buckle switch moves to the 'buckled' position, causing the microprocessor to awaken to the Active state, and then executes a command to the RF transmitter to transmit a 'buckled' RF signal. The microprocessor then sets a sleep timer, such as 30 seconds, and sleeps, where the only power consumed is the sleep timer and the switch detection wakeup circuit, amounting to about 3-5 microamps. Under normal usage conditions, the device will reside in the Sleep state about 4.9% of the time.

After awakening from sleep, the microprocessor powers up and rechecks the buckling status (which remains 'buckled'), repeats the RF transmission of the 'buckled' signal, sets the sleep timer and returns to sleep. Under normal usage conditions, the device will reside in the Active state about 0.1% of the time, and consumes about 0.5-2.0 milliamps, and the device will reside in the Transmission state less than 0.01% of the time, consuming about 3-5 milliamps of only milliseconds at a time.

When the journey ends and the child is removed from the child seat, the restraint device is unbuckled. After the buckling switch moves to the 'unbuckled' position, the microprocessor awakens from sleep due to either (a) the buckling switch event, given the use of certain switch types and components, or (b) the expiration of the sleep timeout period. It then checks the status of the buckling detector, detects and unbuckled state, and causes transmission of an 'unbuckled' RF signal, and returns to the Active state. Upon return, if the buckle switch status is 'unbuckled', the microprocessor instead automatically shuts down to the ultra-low power Dormant state. From the Dormant state, it will be awakened with the next buckle switch event, a buckling of the restraint device.

The microprocessor also includes a buckled-sleep counter which counts the number of consecutive cycles of awakening from sleep and detecting of the 'buckled' switch state. When the counter reaches a preselected number of cycles (a number of cycles typically amounting to an elapsed time of about 12 hours), the microprocessor will bypass the sleep state and instead shut down to the ultra-low power Dormant state. This bypassing of the sleep state presumes that a child would not be placed into a child seat with the restraint device in the buckled state for more than a few hours, and for certainly less than 12 hours. The shutdown of the device to the dormant state more reasonably presumes that the parent had rebuckled the restraint device after last removing the child from the safety seat, or that the child seat with the restraint device in the buckled state has been placed into extended storage. This avoids the higher levels of power drain of the Active-Transmit-Sleep cycles, and dramatically improves battery life. The restraint device is eventually unbuckled with the child seat unoccupied, the microprocessor awakens, checks and transmits the buckle switch status (now "unbuckled"), and puts itself back into the ultralow power Dormant state, awaiting the next buckle switch event.

TABLE A

| Hexidecimal | Decimal | Description |
| --- | --- | --- |
| 00 | 00 | List of PIDs supported (range 01 to 32) |
| 01 | 01 | Status since the last clearing of fault codes |
| 02 | 02 | Fault code that caused the recording of "freeze frame" data |
| 03 | 03 | Fuel system status |
| 04 | 04 | Engine load calculated in % |
| 05 | 05 | Temperature of the engine coolant in ° C. |
| 06 | 06 | Short-term fuel % trim bank 1 |
| 07 | 07 | Long-term fuel % trim bank 1 |
| 08 | 08 | Short-term fuel % trim bank 2 |
| 09 | 09 | Long-term fuel % trim bank 2 |
| 0A | 10 | Fuel pressure in kPa |
| 0B | 11 | Intake manifold absolute pressure in kPa |
| 0C | 12 | Engine speed in rpm |
| 0D | 13 | Vehicle speed in kph |
| 0E | 14 | Timing advance on cylinder 1 in degrees |
| 0F | 15 | Intake air temperature in ° C. |
| 10 | 16 | Air flow measured by the flowmeter in g/s |
| 11 | 17 | Throttle position in % |
| 12 | 18 | Status of the secondary intake circuit |
| 13 | 19 | O2 sensor positions bank/sensor |
| 14 | 20 | Oxygen sensor volts bank 1 sensor 1 |
| 15 | 21 | Oxygen sensor volts bank 1 sensor 2 |
| 16 | 22 | Oxygen sensor volts bank 1 sensor 3 |
| 17 | 23 | Oxygen sensor volts bank 1 sensor 4 |
| 18 | 24 | Oxygen sensor volts bank 2 sensor 1 |
| 19 | 25 | Oxygen sensor volts bank 2 sensor 2 |
| 1A | 26 | Oxygen sensor volts bank 2 sensor 3 |
| 1B | 27 | Oxygen sensor volts bank 2 sensor 4 |
| 1C | 28 | OBD computer specification |
| 1D | 29 | O2 sensor positions bank/sensor |
| 1E | 30 | Auxiliary input status |
| 1F | 31 | Run time since engine start |

I claim:

1. A method for minimizing or preventing the drainage of the electrical capacity of a vehicle battery resulting from use of a portable controller device that plugs into the On-Board Diagnostic II (OBD-II) port of a vehicle and is configured to query a network of the vehicle for a real-time response value for one or more parameters, comprising the steps of:

a) providing the portable controller device that is plugged into the On-Board Diagnostic II (OBD-II) port of a vehicle;

b) monitoring by the portable controller device a value of the voltage potential of a battery of the vehicle;

c) monitoring a vehicle journey status by the portable controller device, comprising:

in an inferring mode the steps of:

i) querying continuously a predetermined monitoring parameter on the network;

ii) comparing a response to the query of the predetermined monitoring parameter against a predetermined inferring response or parameter value that infers that the vehicle journey has changed to 'ended', the predetermined inferring response or parameter value comprising an absence of a response to the query of the predetermined monitoring parameter;

iii) inferring that the vehicle having the vehicle journey status of 'underway' has 'ended', if the response to the query of the predetermined monitoring parameter is the absence of a response to the query of the predetermined monitoring parameter, and identifying the predetermined monitoring parameter as a candidate parameter, and in a confirming mode the steps of:

iv) querying the candidate parameter sequentially within a predefined term, to return a sequence of responses for the candidate parameter;

v) comparing the sequence of responses with the inferring response or parameter value; and vi) confirming that the journey status has 'ended' when the sequence of responses are the predetermined inferring response or parameter value;

d) stopping querying the network by the portable controller device when the vehicle journey status is confirmed to be 'ended', and the monitored vehicle battery voltage potential is at or below a first predefined voltage level that implies an inactive battery charging state; and e) restarting querying the network by the portable controller device only after the monitored vehicle battery voltage potential rises above a second predefined charging level that implies an active battery charging state.

2. The method according to claim 1 wherein the first predefined charging level that implies an inactive battery charging state is 12.6 volts or less.

3. The method according to claim 2 wherein the second predefined charging level that implies an active battery charging state can be 12.9 volts or more.

4. The method according to claim 1, where the controller queries the candidate parameter sequentially a pre-defined plurality of times.

5. The method according to claim 1, where the controller queries the candidate parameter sequentially plurality of times within a predefined time period.

6. The method according to claim 5, where the controller queries the candidate parameter sequentially a plurality of times within three seconds.

7. The method according to claim 6, where the controller queries within one second.

8. The method according to claim 1, wherein the step of querying continuously the predetermined monitoring parameter includes querying a plurality of a predetermined monitoring parameters that include the predetermined monitoring parameter and an additional one or more predetermined monitoring parameters.

9. The method according to claim 8, wherein the predetermined monitoring parameter is selected from the group consisting of RPM, Vehicle Speed, and RUNTIME, and the additional one or more predetermined monitoring parameter is selected from the group consisting of the PIDs listed in Table A.

10. The method according to claim 1 where the step of querying includes querying of the predetermined monitoring parameter and an additional one or more predetermined monitoring parameters.

11. The method according to claim 10, where the predetermined monitoring parameter is selected from the group consisting of RPM, Vehicle Speed, and RUNTIME, and the additional one or more predetermined monitoring parameter is selected from the group consisting of the PIDs listed in Table A.

12. The method according to claim 11, where: (i) the predetermined monitoring parameter is RPM and the predetermined inferring response or parameter value to the query for RPM includes an absence of a response to the query of the monitoring parameter, a zero value, and two or more successive returned parameter values having an identical non-zero value; (ii) a first additional predetermined monitoring parameter is Vehicle Speed and the predetermined inferring response or parameter value to the query for Vehicle Speed includes an absence of a response to the query of the monitoring parameter, and two or more successive returned parameter values having an identical non-zero value; and (iii) a second additional predetermined monitoring parameter is RUNTIME and the predetermined inferring response or parameter value to the query for RUNTIME includes an absence of a response to the query of the monitoring parameter and a zero value.

13. The method according to claim 11, where: (i) the predetermined monitoring parameter is RPM and the predetermined inferring response or parameter value to the query for RPM includes an absence of a response to the query of the monitoring parameter, a zero value, and two or more successive returned parameter values having an identical non-zero value; (ii) a first additional one or more predetermined monitoring parameter is Vehicle Speed and the predetermined inferring response or parameter value to the query for Vehicle Speed includes an absence of a response to the query of the monitoring parameter; and (iii) a second additional one or more predetermined monitoring parameter is RUNTIME and the predetermined inferring response or parameter value to the query for RUNTIME includes an absence of a response to the query of the monitoring parameter, two or more successive returned parameter values having an identical non-zero value, and a zero value.

14. The method according to claim 1 that further provides warning a vehicle operator at an end of a vehicle's journey that a child has been left present or restrained in a child safety seat, further providing the steps of:

A) providing a child safety seat including at least one of a detector for detecting a presence of the child in the child safety seat, or for detecting restraint of a child in the child safety seat;

B) generating and transmitting a child presence or restraint status signal in response to at least one of detecting of the presence of the child, or detecting the buckling of the restraint device;

C) receiving the child presence or restraint status signal by the portable controller device; and D) after confirming that the journey status has 'ended', generating an alarm signal when the child presence or restraint status signal indicates a child is present in, or remains buckled or restrained within, the child safety seat.

15. The method according to claim 14, wherein the controller generates an alarm signal, and an alarm in response to the alarm signal.

16. The method according to claim 14, wherein the child safety seat includes a chest clip, and the detector detects buckling of the chest clip.

17. The method according to claim 14, wherein the detector detects a child's weight, body temperature, movement, or image.

18. The method according to claim 14, wherein the predetermined monitoring parameter includes a plurality of predetermined monitoring parameters that include a first predetermined monitoring parameter selected from the group consisting of RPM, Vehicle Speed, and RUNTIME, and an additional one or more predetermined monitoring parameter selected from the group consisting of the PIDs listed in Table A.

19. The method according to claim 14 where the predetermined inferring response or parameter value further includes a zero value.

20. The method according to claim 14 where the predetermined inferring response or parameter value further includes two or more successive returned parameter values having an identical non-zero value.

* * * * *

UNITED STATES PATENT AND TRADEMARK OFFICE
CERTIFICATE OF CORRECTION

| | | |
|---|---|---|
| PATENT NO. | : 10,127,742 B2 | Page 1 of 1 |
| APPLICATION NO. | : 15/404496 | |
| DATED | : November 13, 2018 | |
| INVENTOR(S) | : Joseph J. Seibert | |

It is certified that error appears in the above-identified patent and that said Letters Patent is hereby corrected as shown below:

On the Title Page

In Related U.S. Application Data, delete "filed on Oct. 16, 2015" and insert --filed on Oct. 19, 2015--

Signed and Sealed this
Twenty-ninth Day of January, 2019

Andrei Iancu
*Director of the United States Patent and Trademark Office*

UNITED STATES PATENT AND TRADEMARK OFFICE
CERTIFICATE OF CORRECTION

| | |
|---|---|
| PATENT NO. | : 10,127,742 B2 |
| APPLICATION NO. | : 15/404496 |
| DATED | : November 13, 2018 |
| INVENTOR(S) | : Joseph J. Seibert |

It is certified that error appears in the above-identified patent and that said Letters Patent is hereby corrected as shown below:

On the Title Page

In (*) Notice, insert --This patent is subject to a terminal disclaimer.--

Signed and Sealed this
Fifteenth Day of April, 2025

Coke Morgan Stewart
*Acting Director of the United States Patent and Trademark Office*